US012801298B2

(12) United States Patent
Tu et al.

(10) Patent No.: US 12,801,298 B2
(45) Date of Patent: Nov. 17, 2026

(54) DYNAMIC MEMORY MANAGEMENT ON GRAPHICS PROCESSING UNITS

(71) Applicant: UNIVERSITY OF SOUTH FLORIDA, Tampa, FL (US)

(72) Inventors: Yicheng Tu, Tampa, FL (US); Minh Hoang Pham, Tampa, FL (US); Hao Li, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 25 days.

(21) Appl. No.: 18/638,595

(22) Filed: Apr. 17, 2024

(65) Prior Publication Data

US 2024/0345746 A1 Oct. 17, 2024

Related U.S. Application Data

(60) Provisional application No. 63/496,427, filed on Apr. 17, 2023.

(51) Int. Cl.
*G06F 3/06* (2006.01)

(52) U.S. Cl.
CPC .......... *G06F 3/0631* (2013.01); *G06F 3/0604* (2013.01); *G06F 3/0644* (2013.01); *G06F 3/0679* (2013.01)

(58) Field of Classification Search
CPC .... G06F 3/0631; G06F 3/0604; G06F 3/0644; G06F 3/0679
See application file for complete search history.

(56) References Cited

U.S. PATENT DOCUMENTS

| | | | | |
|---|---|---|---|---|
| 2008/0209153 A1* | 8/2008 | Schneider | G06F 12/023 | 711/170 |
| 2011/0055495 A1* | 3/2011 | Wolford | G06F 13/1694 | 711/E12.001 |
| 2014/0310484 A1* | 10/2014 | Giroux | G06F 12/109 | 711/170 |
| 2014/0351550 A1* | 11/2014 | Jun | G06F 12/0284 | 711/173 |

(Continued)

OTHER PUBLICATIONS

Li, H. et al., Performance Modeling in CUDA Streams—A Means for High-Throughput Data Processing, 2014 IEEE International Conference on Big Data, IEEE, 2014, pp. 301-310.

(Continued)

*Primary Examiner* — Kee M Tung
*Assistant Examiner* — Khoa Vu
(74) *Attorney, Agent, or Firm* — Husch Blackwell LLP

(57) ABSTRACT

An example system comprises a memory, one or more processors coupled with the memory and configured to execute a plurality of threads, and a memory controller. The memory controller receives a request to allocate memory space for a first thread of the plurality of threads. The memory controller selects a first memory page from a plurality of memory pages in the memory. The memory controller determines whether the first memory page is currently allocated. The memory controller allocates the first memory page for the first thread based on a determination that the first memory page is not currently allocated. The memory controller selects a different memory page from the plurality of memory pages for the request based on a determination that the first memory page is currently allocated.

15 Claims, 18 Drawing Sheets

100

(56) References Cited

U.S. PATENT DOCUMENTS

| | | | | |
|---|---|---|---|---|
| 2022/0012176 | A1* | 1/2022 | Bert | G06F 12/0871 |
| 2022/0050790 | A1* | 2/2022 | Goodman | G06F 12/109 |
| 2022/0214909 | A1* | 7/2022 | Sahita | H04L 9/0643 |

OTHER PUBLICATIONS

Li, H. et al., Concurrent Query Processing in a GPU-Based Database System, PLoS ONE, 2019, 14(4):e0214720, pp. 1-26.

Li, H., System Support of Concurrent Database Query Processing on a GPU, USF Tampa Graduate Theses and Dissertation, 2020, 104 pages.

Rui, R. et al., Efficient Join Algorithms for Large Database Tables in a Multi-GPU Environment, PVLDB, 2021, 14 (4):708-720.

* cited by examiner

DYNAMIC MEMORY MANAGEMENT ON GRAPHICS PROCESSING UNITS

CROSS-REFERENCE TO RELATED APPLICATION(S)

This application is based on, claims priority to, and incorporates herein by reference in its entirety U.S. Provisional Application Ser. No. 63/496,427, filed Apr. 17, 2023.

STATEMENT REGARDING FEDERALLY SPONSORED RESEARCH

This invention was made with government support under 1R01GM140316-01A1 awarded by the National Institute of Health and under CNS-1513126 awarded by the National Science Foundation. The government has certain rights in the invention.

BACKGROUND

Massively parallel systems, such as graphics processing units (GPUs), are increasingly utilized in data-intensive computing environments. Due to a high level of parallelism, there are unique challenges in developing and deploying system software on massively parallel hardware architectures to efficiently support execution of many parallel threads. Some of the unique challenges in developing systems that employ massively parallel hardware relate to execution efficiency of potentially large numbers of parallel threads and architectural complexity of GPU hardware. Dynamic memory allocators, in particular, face challenges such as thread contention and synchronization overhead. Similarly to traditional memory allocators, some dynamic memory allocators utilize a shared structure to keep track of available memory units.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a system comprises a memory, one or more processors coupled with the memory and configured to execute a plurality of threads, and a memory controller. The memory controller is configured to receive a request to allocate memory space for a first thread of the plurality of threads; select a first memory page from a plurality of memory pages in the memory; determine whether the first memory page is currently allocated, allocate the first memory page for the first thread based on a determination that the first memory page is not currently allocated; and select a different memory page from the plurality of memory pages for the request based on a determination that the first memory page is currently allocated.

In another example, a method comprises executing a plurality of threads in parallel using one or more processors; detecting a request to allocate memory space in a first thread of the plurality of threads; selecting a first memory page from a plurality of memory pages in the memory; determining whether the first memory page is currently allocated; and based on a determination that the first memory page is not currently allocated, allocating the first memory page for the request of the first thread.

In yet another example, a device comprises one or more processors coupled with a memory and configured to execute a plurality of threads, and a memory controller. The memory controller is configured to: receive a request to allocate memory space for a first thread of the plurality of threads; select a first memory page from a plurality of memory pages in the memory; determine whether the first memory page is currently allocated; allocate the first memory page for the first thread based on a determination that the first memory page is not currently allocated; and select a different memory page from the plurality of memory pages for the request based on a determination that the first memory page is currently allocated.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

BRIEF DESCRIPTION OF THE DRAWINGS

For a fuller understanding of the invention, reference should be made to the following detailed description, taken in connection with the accompanying drawings, in which.

DETAILED DESCRIPTION

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts. Various embodiments of the present disclosure can also be found in the attached appendices.

As used in this specification and the appended claims, the singular forms “a,” “an,” and “the” include plural referents unless the content clearly dictates otherwise. As used in this specification and the appended claims, the term “or” is generally employed in its sense including “and/or” unless the context clearly dictates otherwise.

In massively parallel systems, dynamic memory allocation is typically associated with high processing overhead and/or other computational inefficiencies, including inefficiencies associated with reliance on global states and/or finding free memory space. For example, traditional memory allocation techniques typically involve maintaining a centralized, managed, global data structure, such as a queue or ‘book’ of free memory pages or other indication of memory available for allocation. However, access to such global data structure can quickly become a bottleneck in a massively parallel system, even if multiple queues are maintained. As an example, consider a scenario where thousands of parallel threads request memory allocation simultaneously. In this scenario, a centralized memory allocator may need to atomically process or otherwise throttle the requests and thus thousands of parallel threads may potentially remain idle while waiting for their respective memory allocation requests to be completed.

Accordingly, aspects of the present disclosure include dynamic memory allocation techniques that address these issues to improve parallel processing system efficiency and performance. In one aspect, example methods are presented that employ a random search procedure to locate free memory pages (e.g., memory addresses available for allocation), in parallel for one or more threads or blocks of threads. In another aspect, example methods are presented to address issues associated with warp divergence and to further improve performance in scenarios where available or free memory is relatively low. These and other aspects are described in more detail within exemplary embodiments of the present disclosure.

Example Systems and Methods

Figure 1:
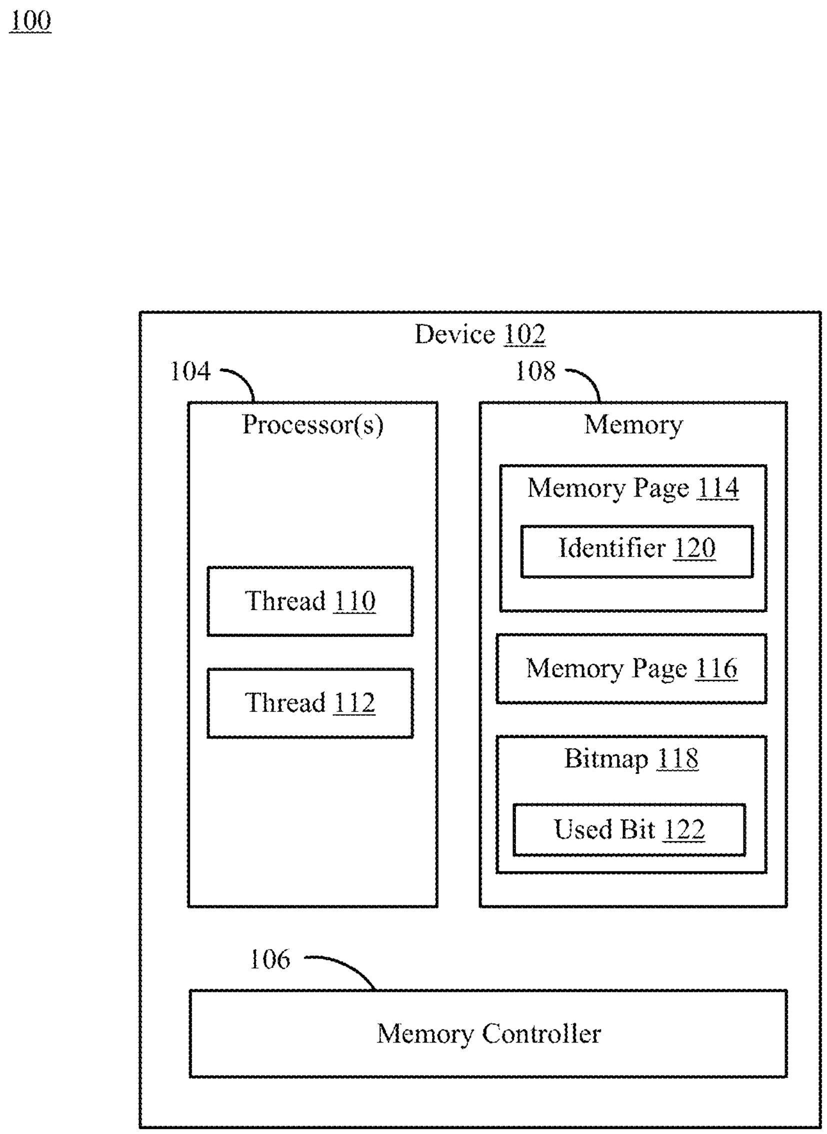
FIG. 1 is a block diagram of an example system that implements dynamic memory management, according to some embodiments.

FIG. 1 is a block diagram of an example system 100 that implements dynamic memory management, according to some embodiments. In the illustrated example, the system 100 includes a device 102, such as an electronic or computational device that will perform multiple/parallel thread processing. For example, device 102 may be a mobile device, a workstation computer, a server, an onboard processing resource of a vehicle, a processing resource of a camera, or other device that may benefit from utilization of parallel thread processing and/or GPUs. Thus, the device 102 includes one or more processors 104, a memory controller 106, and a memory 108. In one or more implementations, the device 102 includes fewer or more components than those shown, such as, for example, a different number of processors 104, memories 108, memory controllers 106, etc.

A non-exhaustive list of example implementations of the system 100 include desktop computers, mobile devices, laptops, servers, desktops, mobile devices, wearable devices, and any other types of computing devices or systems. In some examples, the device 102 is implemented as an electronic circuit that performs the various functions and operations described herein, such as for example, executing one or more threads 110, 112 using the processor(s) 104 and/or the memory 108. (It will be understood that, depending on how a given application is written and/or how the software platform that manages the device architecture operates, there may be many individual threads, warps, or blocks or grids of threads—discussion herein of “threads” is meant to encompass any such structures and parallelisms as applicable). To that end, a non-exhaustive list of example devices 102 includes a central processing unit (CPU), a GPU, a field programmable gate array (FPGA), an accelerator, a digital signal processor (DSP), or any other processing device. In an example, the one or more processors 104 include one or more processor cores, where each core is a processing unit that reads and executes instructions (e.g., of a thread), such as instructions to add, subtract, move data, read data from memory 108, write data to memory 108, etc.

Certain advantages of the techniques described herein may be best leveraged in systems in which the processor(s) 104 comprise a manycore processor as opposed to simply a multicore processor. A multicore processor would typically be understood to reference a CPU with a comparatively smaller number of cores (e.g., 8 cores, 10 cores, 16 cores, etc., up to a few dozen depending on intended use) that are integrated on a single chip and work together to execute tasks simultaneously. In contrast a manycore or highly-multicore processor would typically be understood to refer to a processor having a significantly larger number of cores, often number in the hundreds or thousands of cores. These processors are designed so that they can process multiple different tasks or threads in parallel—for example, the many cores may be designed to efficiently processes extremely large, parallel workloads such as in processing large simulations, scientific data, machine learning algorithms, deep neural networks, graphics rendering, etc. For example, a GPU would typically be considered a manycore processor rather than a multicore processor, as they are often constructed to enhance their ability to perform massively parallel processing tasks. In comparison, multicore CPUs are typically optimized for general-purpose computing tasks and sequential, flexible processing tasks.

In some examples, the processor(s) 104, the memory controller 106, and the memory 108 are coupled to one another via a wired or wireless connection. Example wired connections include, but are not limited to, data buses, interconnects, traces, and planes.

The memory controller 106 includes any combination of hardware or software configured to manage access (e.g., read, write, allocation requests, etc.) to the memory 108 by the processor(s) 104. It is noted that although the memory controller 106 is depicted as a separate component, in alternative examples, the functions of the memory controller 106 are implemented by the processor(s) 104 and/or the memory 108. The memory controller may comprise software running within an operating system or kernel of the processor(s) 104, or may be a separate processing circuit. In accordance with at least some aspects of the present disclosure, the memory controller 106 is configured to allocate memory pages 114, 116, etc. for the threads 110, 112, etc.

In at least some implementations, the memory 108 includes one or more integrated circuits configured to store data for the device 102. Examples of the memory 108 include any physical memory. In an example, the memory 108 includes a semiconductor memory where data is stored within one or more memory cells in one or more integrated circuits. In some examples, the memory 108 includes volatile memory, examples of which include random-access memory (RAM), dynamic random-access memory (DRAM), etc. In some examples, the memory 108 includes a cache memory of the processor(s) 104 or any other type of physical memory accessible to the processor(s) 104. Alternatively or additionally, the memory 108 includes a non-volatile memory, such as for example, a solid state disk (SSD), flash memory, read-only memory (ROM) programmable read-only memory, among other examples. The memory 108 is programmable in a variety of ways that support performance of operations using data stored in the memory such as, e.g., data stored in memory pages 114, 116, and/or bitmap 118.

As noted earlier, the memory 108 is configured to store a plurality of memory pages, exemplified by memory pages 114 and 116. Each memory page, for example, may correspond to a range of memory addresses mapped to an identifier (e.g., identifier 120 of memory page 120). Thus, for example, the memory controller 106 accesses a memory space in the memory 108 corresponding to memory page 114 using a value of the identifier 120.

In at least some implementations, the bitmap 118 includes a section of the memory that stores information about a state of the memory pages 114, 116, etc. For instance, the bitmap 118 includes 'used' flags or 'used' bits, exemplified by used bit 112, associated with each of the memory pages 114, 116, etc., in the memory 108. In this way, for example, a processor thread and/or the memory controller 106 can read the bitmap 118 (or a portion thereof) to check a current status of multiple memory pages (e.g., allocated or not allocated).

In this regard, the bitmap 118 presents a tool for simplification of memory management and allocation, that can be leveraged in association with certain methods of the present disclosure. In embodiments of the system 100, bitmap 118 may differ from traditional memory allocation tables in its simplicity, as further described below. For example, a traditional memory allocation table or 'book' may be utilized to keep a managed list of allocation of memory resources (e.g., device memory for a GPU, host memory for the host CPU to a GPU, etc.), and the memory management 'book' is consulted for new memory allocations and deallocations via specific functions of an operating system or kernel. Thus, a master routine governs changes to the memory management 'book.' In some traditional computing platforms, a set of APIs, libraries and/or functions may be provided to allow software developers to send commands for memory allocation (e.g., cudaMalloc( ) for NVIDIA's CUDA system to allocate device memory from a managed memory table) and deallocation. In contrast, the bitmap 118 may in some embodiments provide for a less centralized management of memory, by allowing each thread to find its own memory (randomly choosing free memory space) and set a flag or bit to indicate the memory has been 'claimed', and/or allowing each thread to release or deallocate its own memory by setting the flag or bit to indicate the memory is 'available.' In further embodiments, a blended system may be utilized in which some threads rely on a master routine for allocation of memory while others allocate and deallocate their own memory.

In some embodiments, memory 108 may be organized into standard size "pages", of predetermined, consistent bit size. In such embodiments, a thread may request memory allocation page by page, or in increments of several pages, of a standard page size, such as page 114. In other embodiments, as described below, memory 108 can be allocated dynamically so that threads can be allocated different size blocks of memory 108.

In operation, a device 100 that is running multiple threads would utilize a memory allocation or buffer management software (often in a lower level tier of software/firmware, such as a low-level routine of an operating system or kernel) to ensure that threads running in parallel are allocated free memory and there are not multiple threads trying to utilize the same memory locations. Thus, a thread may make a request to the OS or kernel for memory allocation, and some latency will exist before the OS or kernel returns with a specific memory location that is allocated to the thread. For example, a memory management software may return memory allocations in 16 byte portions. In massively parallel projects, this latency can accumulate and cause significant delays in processing time. Thus, the procedure for how buffer/memory management software allocates free memory can be an important area for improving processing time and efficiency.

Figure 2:
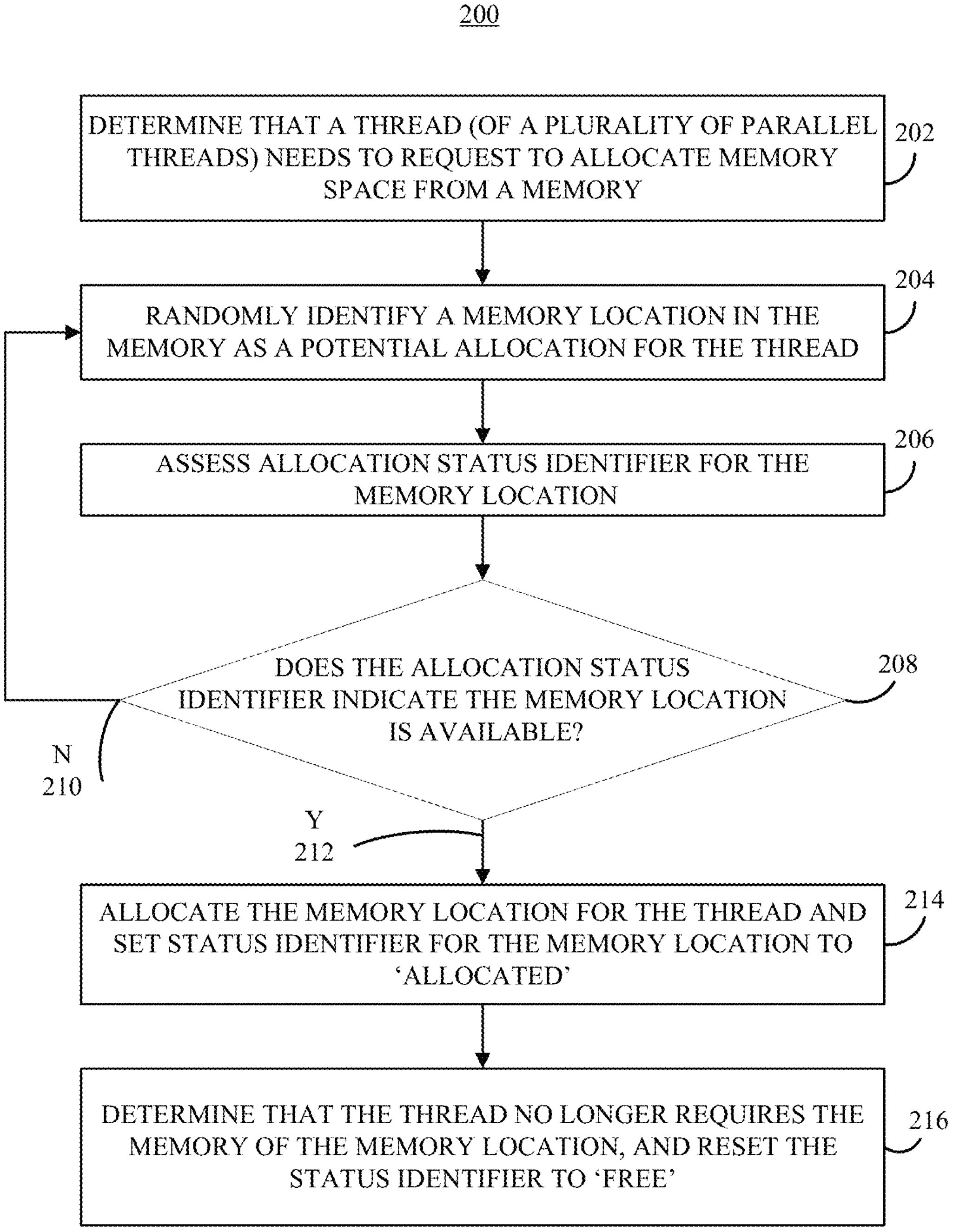
FIG. 2 depicts a procedure in an example implementation of dynamic memory management, according to some embodiments.

FIG. 2 depicts an example process 200 for memory allocation and management. Process 200 may be performed by, on, within, or in association with a device such as device 100. FIG. 2 is, thus, in an example implementation of dynamic memory management, according to some embodiments. In the following description, alternative reference is made to the process and/or a memory controller performing a given step. It is to be understood (as described below), that aspects of the techniques of this disclosure can be implemented either as a pure software solution, as a hybrid of software and hardware architecture functions, or as an adaptation to hardware architecture (e.g., a hardware-based memory controller), and any discussion of a process/algorithm/software as performing a step, activity or block should be understood to also contemplate a software/hardware hybrid or hardware component performing the same, and vice versa.

In the procedure 200, a processor (e.g., a GPU) is running a processing task. At block 202, a request is received (e.g., by a memory controller) to allocate memory space for a first thread of a plurality of threads (e.g., 110, 112, etc.) executing on the processor (such as the one or more processors 104). As an example, the threads 110, 112, etc. are configured to execute as parallel threads on the one or more processors 104. In this example, the first thread (e.g., thread 110) calls a memory allocation function in accordance with the present disclosure to cause the memory controller 106 to allocate one or more free memory pages (i.e., a portion of the memory 108) for the thread 110.

In response to receiving or detecting the request of the first thread, the memory controller 106 selects a first memory page (e.g., 114) from a plurality of memory pages (e.g., 114, 116, etc.) in the memory 108 (block 204). In an example, the memory controller 106 selects the first memory page by randomly selecting an identifier of the first memory page (e.g., identifier 120) from a plurality of identifiers of memory pages in the memory 108. For instance, the memory controller 106 selects a random value in a range of values that correspond to identifiers (IDs) of each of the memory pages 114, 116, etc.). In some embodiments, instead of or in addition to a centralized memory controller, the first thread itself may perform the task of randomly selecting the identifier (or, in another sense, the thread may initiate its own function to perform the task on its behalf).

Because the memory identifier is randomly selected, there is not a priori certainty of the allocation status of the identified memory block: it may be that the associated memory block is not actually available. On a per-thread basis, this approach may seem inefficient in comparison to a more centrally managed system that would only return an identifier for available memory, based on its managed table. However, as discussed (and demonstrated) below in the examples section, on a larger scale, this random selection approach achieves orders of magnitude greater efficiency in memory allocation. In other words, per-thread efficiency for memory allocation may decrease, but overall efficiency of memory allocation in highly parallel processing situations is greatly increased.

In an alternative, process 200 may entail a modified approach or weighted approach for random selection of memory locations. For example, process 200 at block 204 may include identifying the last memory page/location that was found to be free (and, thus, allocated) for a thread prior to current request; and selecting a cluster corresponding to a subset of the plurality of memory pages based on that last memory page/location. In these examples, randomly selecting the identifier mapped to the first memory page is from the selected cluster. For example, in some scenarios, memory pages near a recently allocated memory page are likely to be free. Thus, an example system may focus its search for free memory pages in a portion of the memory 108 (i.e., the cluster) that is likely to have free memory pages.

In yet further examples, the memory controller's clustering approach can be "seeded" at the commencement of (or during) large parallel processing tasks via an indication of the most common sizes of memory allocation that are or will be requested. Thus, if memory requests are for comparatively smaller memory page sizes, for example, then the cluster size may be also comparatively small. Correspondingly, if memory requests are for larger allocations of memory (e.g., multiple blocks or pages, or a large dynamic request), then the cluster sizes could be increased and fewer clusters used.

In yet further embodiments, tentative "clusters" may be defined spatially in a memory at the outset of a new large parallel processing task, and new requests for memory allocations can be rotated through each cluster—in other words, upon calling a memory allocation function, a thread may be directed to randomly search within a given cluster, and the next thread randomly to randomly search within a different cluster. The cluster spatial definitions, or a weighting of which cluster is recommended next, can then be dynamically adjusted as searching within each cluster begins to establish that availability of memory in the cluster is low or availability in the cluster is high. For example, if a requests to a given cluster tend to show a below average rate of finding free memory, that cluster can be searched less frequently on a per-thread basis, or can be combined with another cluster, or shifted in location to move toward areas of the memory tending to have free memory available more frequently.

Alternatively, guided randomness approaches (such as searching near previously-available space, or searching in designated clusters or spans of memory) can be blended with pure randomness approaches. For example, on a per-thread basis, a thread's memory allocation search function may be configured to look within a given cluster a set number of times (e.g., 2×, 3×, 5×, 10×, etc.) before reverting to a memory-wide pure random approach.

Next, the process 200 examines a status indicator (e.g., a bit or flag, or other indicator of whether a memory location is currently allocated or not) that is indicative of whether the first memory page is currently allocated, at block 206. For example, a specific memory page selected at block 204 could be one that was previously allocated in a call by the same thread or a different thread, and so examination of a setting or flag can be used to quickly determine whether the location is free or not. To facilitate determining whether a selected memory page is currently allocated, in some examples, a memory controller 106 reads a 'used' bit associated with that memory page (e.g., used bit 122) to determine whether that specific randomly selected memory page is already allocated or if it is still free or available for allocation.

At block 208, the process 200 determines, based on the status identifier, whether the first memory page is free and/or not currently allocated (path 212), or not free and/or currently allocated (path 210).

For example, if a memory controller 106 determines that the memory page randomly selected was already/currently allocated (path 210), then the memory controller 106 reverts to block 204 and randomly selects a different memory page from the plurality of memory pages in the memory 108 for the request of block 202. In some examples, the memory controller 106 continues to select different memory pages randomly and checks if the selected page is free (i.e., available for allocation) until a free memory page is identified.

If process 200 determines that the currently-identified memory location from block 204 is available, then the process allocates the memory location for the request of the thread. For example, a memory controller 106 allocates a memory page 114 for a memory allocation request by the thread 110 by returning the identifier 120 to the thread 110 and updating the used bit 122 of the memory page 114 to a value that indicates that the memory page 114 is now allocated (i.e., no longer free).

The memory location will then appear 'used' to other threads that are simultaneously or subsequently requesting a memory allocation. In this way, for example, the process 200 enables multiple parallel threads to receive memory page allocations in the memory 108 during parallel execution, for example, by accessing random candidate memory pages and/or their respective used bits in a parallel manner.

At block 216, when the thread is finished with the allocated memory at the memory location, it can generate a signal indicating that the memory can be deallocated. In this circumstance, the process 200 then resets the status indicator for that memory location to 'available' or 'unused', so that any threads that are currently or subsequently requesting memory could identify that same location and claim it for their own allocation.

Furthermore, process 200 may be adapted such that certain steps are adjusted in order to implement a Random Walk, Clustered Random Walk, and/or Cooperative Random Walk technique as described below. For example, the manner in which a "random" memory location is selected in block 204 may be a Clustered Random Walk or pure Random Walk approach. And, the manner in which a given thread claims memory as its own allocation may be purely individualized or part of a Cooperative Random Walk approach.

It should be understood that the above described steps of the process of FIG. 2 can be executed or performed in any order or sequence not limited to the order and sequence shown and described in the figures. Also, some of the above steps of the process of FIG. 2 can be executed or performed substantially simultaneously where appropriate or in parallel to reduce latency and processing times.

Example Embodiments and Experimental Findings

Figure 3:
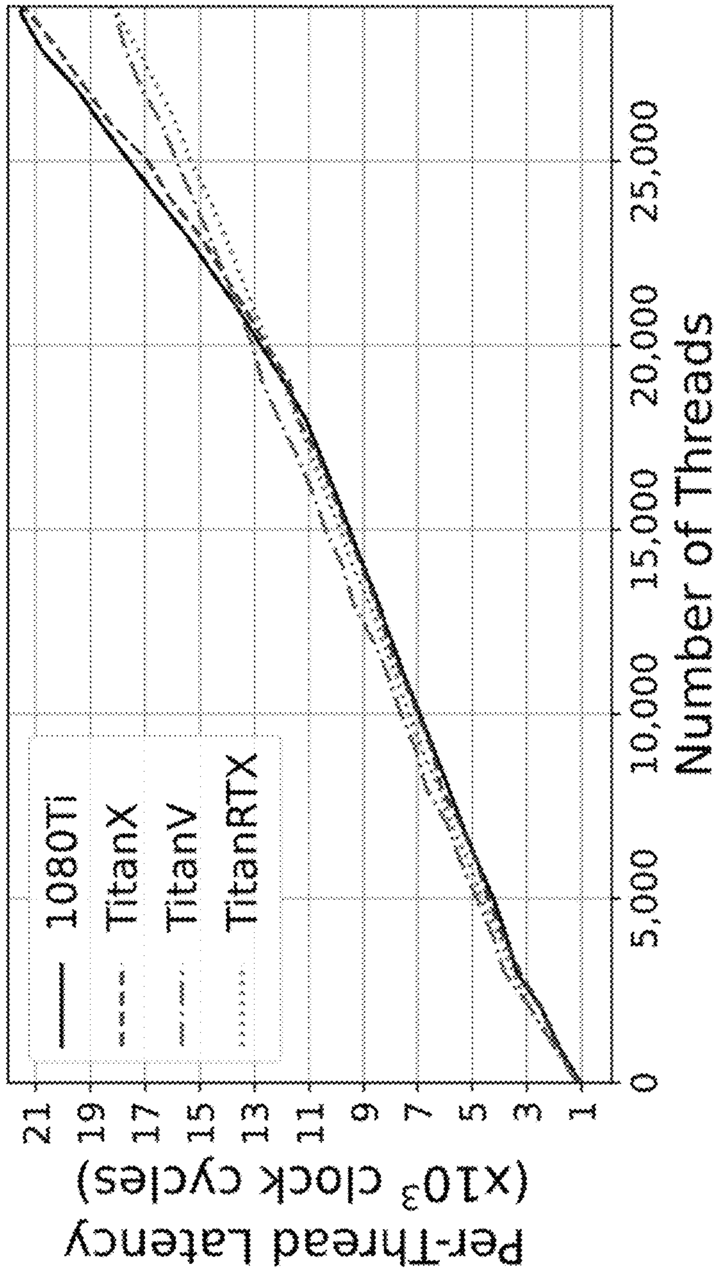
FIG. 3 is a graph illustrating an example of the average latency in accessing a global variable via an atomic operation, according to some embodiments.
Figure 4:
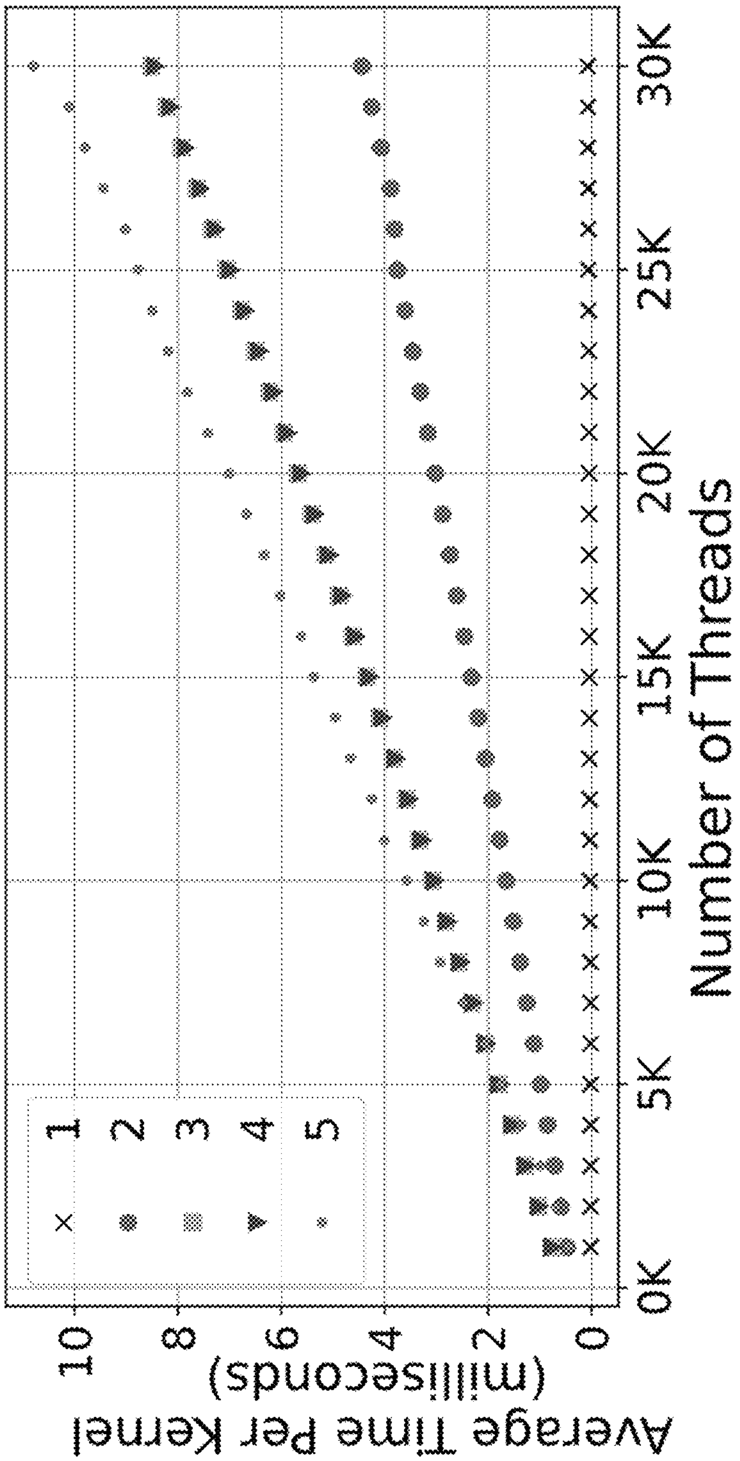
FIG. 4 is a graph illustrating an example latency performance under five scenarios, according to some embodiments.

For the sake of example, FIG. 3 illustrates example measurements of average latencies versus number of threads when accessing a global variable using atomic operations in several different GPUs. FIG. 4 illustrates performance of a GPU in various scenarios (1: each thread allocates then frees 4096 bytes; 2: each thread allocates 4096 bytes; 3: each thread allocates 4100 bytes; 4: each thread allocates 8,192 bytes; 5: each thread allocates varying sizes of memory space).

Figure 5:
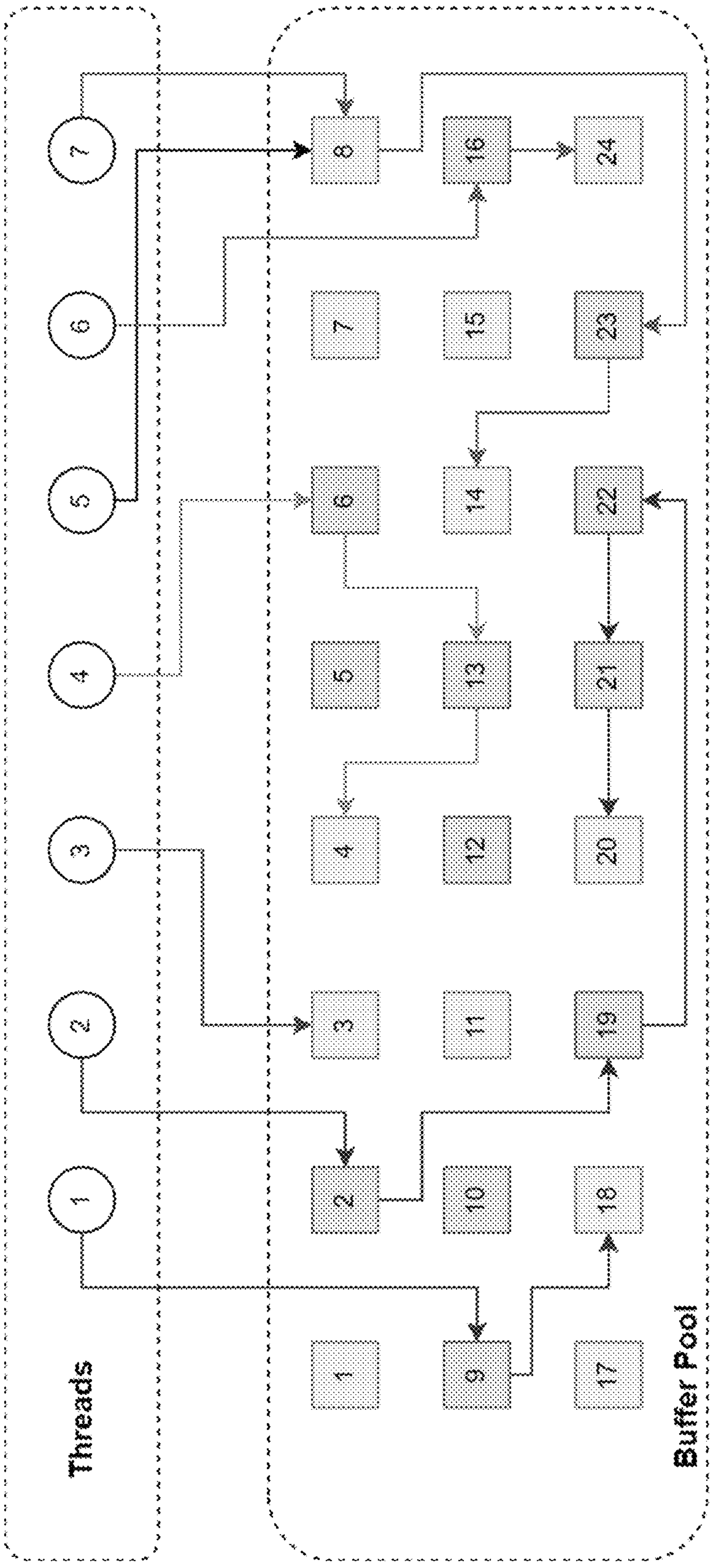
FIG. 5 is an example RW-based page request algorithm, according to some embodiments.

Random Walk Based Parallel Memory Management Framework: FIG. 5 is a block diagram of an example implementation of dynamic memory allocation, according to some embodiments. In this example, a main memory for a GPU is divided into pages of equal size. In previous studies on CPUs and GPUs, mutex locks and queues were utilized to avoid Write After Write. A small number of queues and mutex locks can become a bottleneck in a GPU system when tens of thousands of threads request simultaneously. To make a better design to fully release the parallel computing power of GPUs, a Random Walk (RW) algorithm is proposed herein, which does not necessarily depend on a global state to manage page allocation and recycling. Instead of using a few mutex locks or queues on global memory for the entire system, in this example, each memory page is configured to have its own mutex lock (via a used flag or used bit). When the flag is set, the page is considered to be not available. In requesting a memory page, each thread will generate or select a random page ID (e.g., ID 120 of memory page 114). If a corresponding memory page is free (e.g., having a used bit value 122 indicating that it is not currently allocated), the thread will get the page. Otherwise, the thread will generate or select a new or different page ID until a free or available memory page is found. Advantageously, in some examples, this process enables finding a free memory page to allocate for each thread even if all threads act independently (i.e., there is no need to wait in a queue to access a shared state). As a result, the present methods release the parallel computing power of a GPU to a greater extent. FIG. 5 shows an illustrative example of how seven parallel threads (1, 2, 3, 4, 5, 6, 7) get memory allocations corresponding to free memory pages (respectively labeled 18, 20, 3, 4, 8, 24, and 14). In this example scenario, squares 1, 3, 4, 7, 8, 11, 14, 15, 17, 18, 20, and 24 of the buffer pool (e.g., memory 108) represent free memory pages, and squares 2, 5, 6, 9, 10, 12, 13, 16, 19, 21, 22, 23 represent occupied or previously allocated memory pages. Each thread repetitively generates or selects a random page IDs until it finds a free page. For example, thread '1' first selects memory page '9' (which is determined to be not available or already allocated), then selects memory page '18'' (which is determined to be free or available for allocation), and so on.

An example implementation of the RW-based algorithm (GET PAGE) described above is presented in Algorithm 1 below. Note that the pseudo-code presented below represents code that is executable from the perspective of a single thread, reflecting the single-program-multiple-data (SPMD) programming model for modern GPUs. Thus, in some examples, similar pseudo-code can be executed in parallel for different threads.

Algorithm 1 GET PAGE Based on Random Walk

```
output: the ID of a free page
1:   while True do
2:     p ← random integer within [0,T)
3:     if pages[p].used is false then
4:       try to set pages[p].used to true
5:       if Above is success then
6:         return p
7:       end if
8:     end if
9:   end while
```

Knowing the drawbacks of queue-based ideas, the advantage of RW-based solution is still counter-intuitive: the traditional queue-based method allows for O(1) time in finding a free page while it could take many steps for RW. However, although the number of steps to get a free page can be big for some threads (e.g., 5 steps for thread 2), the average number of steps is highly controllable in most scenarios.

Although there are no global variables, acquiring a free page still needs an atomic operation (line 4 of Algorithm 1) because the two threads could try to grab the same free page at the same time. For example, in FIG. 5, threads 5 and 7 request page 8 in their first step. However, the atomic operation will only grant access to one thread (e.g., thread 5), and the other thread (e.g., thread 7) will continue their random walk. The is an example scenario in which two threads (i.e., threads 5 and 7) can conflict in accessing protected data. This scenario can occur with a very low probability. For example, with 1 million total pages and 5,000 concurrent threads, the expected number of conflicts is only 12.5. Nevertheless, in this example, the present method enables handling such conflict scenario by causing one of the threads (e.g., thread 7) to skip the conflicted memory page '8' while it is being allocated to thread 5.

Performance Analysis: In general, latency (of individual threads and all the threads) in an appropriate metric for evaluating the performance of memory management mechanisms. However, the running time of a program is affect by many factors. Instead, the following two metrics are used:

1. Per-Thread Average Steps (TAS): the average number of steps taken to find a free page for a thread. In Algorithm 1, this is essentially the average number of iterations executed for the while loop.
2. Per-Warp Average Steps (WAS): the average of the maximum number of steps taken among all 32 threads within a warp.

Both metrics are directly correlated to latency. While WAS has a stronger correlation with latency than TAS, a more rigorous analysis is achieved of the latter. In Compute Unified Device Architecture (CUDA), the basic unit of execution is a warp—group of 32 threads scheduled and executed simultaneously by a streaming multiprocessor. The entire warp will hold the computing resources until all threads are exited. In other words, the latency of a warp is the maximum latency among all 32 threads in the warp. The effectiveness of the two metrics was verified via a large number of experimental runs: the results show that the correlation coefficient between TAS and the total running time is 0.9046 and 0.962 for WAS.

The main analytical results are as follows. First, the TAS of queue-based solutions is:

$$E(X_i) = \frac{N+1}{2}, \tag{1}$$

and the WAS of queue-based solutions is:

$$E(Y) = \frac{32}{33}N. \tag{2}$$

Both metrics are linear to N. This is consistent with the results shown in FIG. 3. Maintaining multiple queues will not solve the problem, as both TAS and WAS are still linearly related to N.

The TAS of the RW algorithm in Algorithm 1 is:

$$E(X_i) = \frac{T}{N}\ln\left(\frac{A}{A-N}\right), \tag{3}$$

and the WAS of RW is upper bounded by:

$$E(Y) < \sum_{k=0}^{\infty}\left[1-\left(1-\left(\frac{(T-A+N)}{T}\right)^k\right)^{32}\right]. \tag{4}$$

Unlike the queue-based solution with latency linear to N, Equation 3 illustrates that the value grows very little with the increase of N. Specifically, under a wide range of N values, the item $$\ln\left(\frac{A}{A-N}\right)$$

increases very slowly (in a logarithmic manner), and the inverse of N will further offset the increase of $E(X_i)$. The only situation that could lead to a high number of steps is when A≈N, i.e., barely enough pages are available for all the threads. Equation 3 has a linear growth with the increase of T, but in practice, a larger T value also leads to an increase in A, which would offset the growth by decreasing the logarithmic term.

Figure 6:
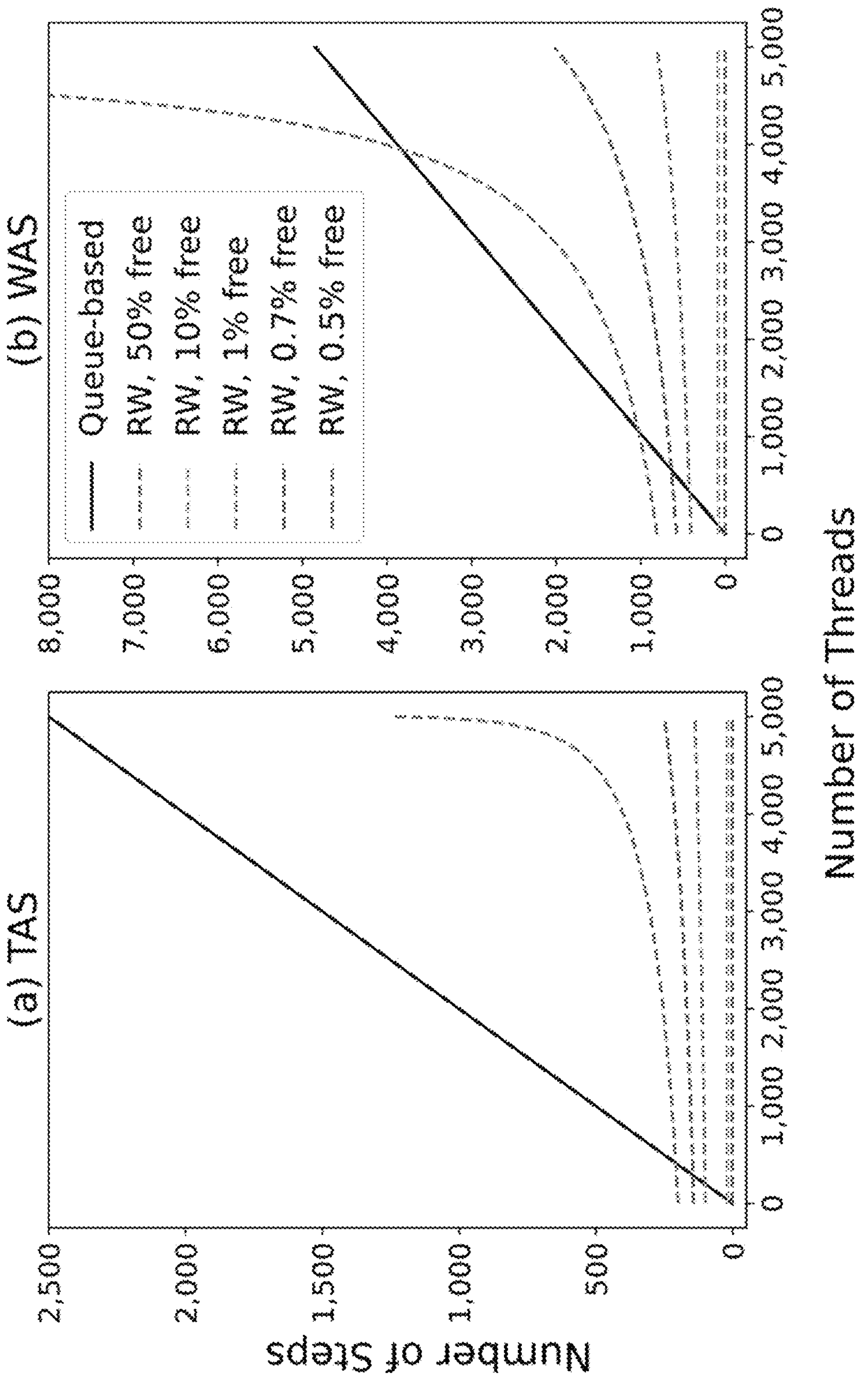
FIG. 6 shows two graphs illustrating TAS and WAS values under various conditions, according to some embodiments.

The above results are plotted in FIG. 6, where the values of formulae 1-4 are plotted under different A and N values with T=1M. Five different A value were chosen to correspond to 50% m 10%, 1%, 0.7%, and 0.5% of total pages T. Note that the case of 0.5% is an extreme scenario—where N=5,000, only one page is available for each thread. TAS and WAS of RW are smaller than those of queue-based solutions, even under small A/T values such as 0.7%. For the extreme case of A/T=0.5%, it can be seen that RW's WAS starts to climb higher than the queue-based method, which is addressed with Bitmap data structures and CRW algorithms described below.

Extension: A Bitmap of Used Bits: In each step of GET PAGE in the basic RW design, in some examples, a thread visits one page at a time. As a result, finding a free page could take many steps, especially under a low A/T ratio. To remedy this, in at least some implementations, a Bitmap is used to store all pages of used bits in consecutive (global) memory space. A GPU's high memory bandwidth and in-core computing power is utilized to efficiently scan the bitmap to locate free pages. For example, the Titan V has a global bandwidth of 650+GBps and a 3072-bit memory bus. Meanwhile, the CUDA API provides a rich set a hardware supported bit-operating functions.

Algorithm 2 GET PAGE Based on RW-BM

```
output: the ID of free page
while True do
    p ← random integer within [0,T/w)
    r ← Atomically set LockMap[p] to 1
    p ← (r ==1)? 0xffffffff : BitMap[p]
    f ← ffs(~P)
    if f is valid then
        set f^th bit in BitMap[p] tp 1
        return p*w+f−1
    end if
end while
```

In practice, the bitmap can be implemented as an array of 32-bit or 64-bit integers (words) so that a group of 32 or 64 pages can be visited in a single read. Finding a free page now reduces to finding a word from the bitmap that has at least one unset bit. Such an algorithm (named RW-BM) can be easily implemented by slightly modifying Algorithm 1, as presented in Algorithm 2. Note that, for each word in the used bitmap, a lock bit is introduced and stored in another bitmap called LockMap. This LockMap is for the implementation of low-cost locks.

When there are A pages available, and w bits are read at a time, the probability of finding a group with at least a free page is $$1-\left(\frac{T-A}{T}\right)^w.$$

Therefore, the expected number of steps for the first thread to find a free page is:

$$\frac{1}{1-\left(\frac{T-A}{T}\right)^{w}}. \tag{5}$$

Following the same logic in deriving Eq. (3) and Eq. (4):

$$E(X_i)=\frac{1}{N}\sum_{j=0}^{N-1}\frac{1}{1-\left(\frac{T-A+j}{T}\right)^{w}}. \tag{6}$$

Theorem 1 Denote the TAS E(x) for RW-BM as U', and that for the basic RW algorithm as U:

$$\lim_{A\to N} U' = \frac{U}{w}.$$

Theorem 2 Denote the upper bound of E(Y) for RW-BM as V', and that for the basic RW algorithm as V:

$$\lim_{A\to N} V' = \frac{V}{w}+\frac{w-1}{2w}.$$

The above theorems are encouraging in that TAS and the WAS bound both decrease by a factor up to w, i.e., 32 or 64 times. More importantly, the advantage of RW-BM reaches the highest level when A→N, which is an extreme case of low free page availability.

RW-BM is memory efficient: a one-bit overhead is negligible even for page sizes as small as tens of bytes, and the total size of the LockMap is even smaller.

Advanced Techniques: The basic RW algorithm provides a framework for developing more advanced algorithms. The goal is to improve performance, especially when the percentage of free pages is small. Two advanced techniques are presented that address this problem: a Collaborative RW (CoRW) design that closes the gap between TAS and WAS, and a Clustered RW (CRW) design that utilizes the spatial property of the Bitmap. Both techniques share the same idea of reusing multiple empty pages found by a thread—CoRW shares the found pages among sibling threads in a warp while CRW saves pages for future requests by the same thread. CoRW and CRW are designed for different use cases: CoRW assumes the getPage requests from threads in a warp are processed at the same time, while CRW is more applicable to sporadic requests in the warp. Two examples of the different use cases are presented in Listing 1. In the first use case, CoRW is very effective because all threads in a warp request memory. In the second use case, the collaboration in CoRW cannot happen because only one thread in a warp requests memory, so CRW is more useful.

Listing 1: Example Use Cases of CoRW and CRW

```
___global___ void example( ){
  int pid = getPage( ); // case 1
  if(threadIdx.x == 0)// case 2
    pid = getPage( );
}
```

Collaborative Random Walk Algorithm: As mentioned earlier, the basic RW design suffers from the large difference between TAS and WAS. The idea to remedy that is to have the threads in the same warp work cooperatively—threads that found multiple pages from the bitmap will share the pages with others that found nothing. This can effectively reduce the WAS because all resources on a warp are always spent on finding free pages. The algorithm runs in two steps: (1) the threads work together to find enough free pages to serve all getPage requests of the entire warp; (2) the identified free pages are assigned to individual threads according to their needs. All threads terminate at the end of step (2); thus the same TAS and WAS values are produced.

Efficient implementation of the above idea is non-trivial. The main challenge is to keep track of the found pages and distribute them to requesting threads in a parallel way. The SIMD nature of warp execution also requires minimization of code divergence. The CoRW algorithm was designed by taking advantage of CUDA shuffle instructions that allow access of data stored in registers by all threads in a warp. The design of CoRW is shown in Algorithm 3. Note that many CUDA intrinsic function names are used in the pseudocode to highlight implementation details.

In Algorithm 3, needMask is a 32-bit mask representing which threads still need to get a page and hasMask represents those that find a free page during the search process. The needMask is computed in lines 3 and 15, and hasMask is computed in lines 8 and 16. The search process was performed on all threads until all threads have obtained a page, i.e., needMask becomes 0 (line 4). The repeated search process is as follows. First, each thread reads a random word of the bitmap (line 7) denoted as BitMap[p]. Note the use of LockMap here: the value of LockMap[p] was first set to 1; this essentially locks the word BitMap[p] and is done via a single atomic operation (line 6). An innovation here is: if another thread already locked the word (when r=1), the word cannot be used as a source of free pages. Instead of idling, it will return a word with all bits set and continue the rest of the loop body acting as a consumer of free pages.

Algorithm 3 GET PAGE Based on CoRW

```
input: w: word length, typically 32 or 64
output: pageID: ID of a free page acquired
 1:     t ← lane ID (0-31) of this thread
 2:     pageID ← −1
 3:     needMask ← ballot__sync(pageID == −1)
 4:     while needMask do
 5:       p ← random integer within [0,T/w)
 6:       r ← Atomically set LockMap[p] to 1
 7:       P ← (r == 1)? 0xffffffff : BitMap[p]
 8:       hasMask ← ballot__sync(P ≠ 0xffffffff)
 9:       while needMask ≠ 0 and hasMask ≠ 0 do
10:         Find the first 0 bit on P and set it to 1
11:         b ← corresponding pageID of the bit set above
12:         s ← popc~(0xffffffff << laneID) & needMask)
13:         t' ← pageID == −1? fks(hasMask, s+1)−1 : −1
14:         pageID ← shfl__sync(b,t')
15:         needMask ← ballot__sync(pageID == −1)
16:         hasMask ← ballot__sync(P ≠ 0xffffffff)
17:       end while
18:       Release LockMap[p] if r == 0
19:     end while
20:     return pageID
```

The free pages are then shared among threads (lines 10 to 16) while some threads still need a page, and some still have pages to share (line 9). This is difficult because the CUDA shuffle instructions only allow a thread to read data from another thread, i.e., the receiving threads have to initiate the transfer. Therefore, the solution is to calculate the sending lane ID t' as follows. Each thread calculates s, the number of threads with lower lane ID that still need to get a page as indicated by needMask (line 12). Then this thread has to obtain the (s+1)-th page found within the warp because the first s pages should be given to the lower lanes. Therefore, t' is the position of the (s+1)-th set bit on hasMask.

The fks function finds the k-th set bit by using log(w) population count (popc) operations. Its implementation can be found in Algorithm 4. This function allows one to calculate the sending thread t' (line 13). Finally, the value of variable b held by thread t' is transferred to this thread via the shfl_sync function (line 14).

The CoRW implementation is efficient because all data (other than Bitmap[p]) are defined as local variables and thus stored in registers. Furthermore, all steps (except reading BitMap[p]) are done via hardware-supported functions with extremely low latency. For example, finding the number of set bits (popc) in a word can be done in 2 clock cycles, and finding the first set bit (ffs) in 4 cycles. Such latency is in sharp contrast to reading the bitmap from the global memory, which requires a few hundred cycles.

Performance of CoRW: In the CoRW algorithm, all threads work together until each secures a page. This means that the values of WAS and TAS are identical, which is the number of steps it takes for a warp to get 32 free pages. In each step, a warp can probe 32w pages by using the Bitmap (32 threads×w pages per thread). The probability p of finding a free page is dynamic and depends on the activity of other warps in the system. However, p is lower bounded by $$\frac{A-N}{T}$$

where A is the total number of free pages, N is the number of threads searching, and T is the number of pages. As the probability p of identifying a free page diminishes, the number of steps to find 32 free pages increases. Therefore, the goal is to find an upper bound, B, on WAS and TAS.

To model the count of free pages found in an experiment with predetermined trials and probability, a Binomial random variable is a suitable choice. At step i, let $C_i$ be the number of free pages found, then $C_i$ is a Binomial random variable with parameters n=32w (number of trials) and $$p=\frac{A-N}{T}$$

(probability of finding a free page). The cumulative number of free pages found up to step i is given by the partial sum $$S_i=\sum_{j=1}^{i} C_j \text{ with } S_0=0.$$

Then the upper bound B is the smallest integer such that $S_B \geq 32$. In other words, B is the first time the stochastic process $S_i$ reaches 32. In the next steps the first passage time B shall be calculated. The main disadvantage of using the Binomial distribution to find first passage time directly is that it can be computationally expensive, especially for large values of n, the number of trials. For efficiency, it is often resorted to using the Normal distribution as a quicker approximation to calculate the first passage time. The Normal distribution also presents more convenient mathematical properties.

Given a Binomial distribution, a Normal curve with the same mean and standard deviation can often serve as a robust and reliable approximation of the Binomial distribution. The validity of using a Normal distribution as an approximation for a Binomial distribution is generally accepted when the size of the trial n is sufficiently large and the success probability p is not too close to either 0 or 1. A general rule of thumb is that both $np \geq 5$ and $n(1-p) \geq 5$. This may ensure that the central 95% of the Normal distribution lies between 0 and n, which is necessary for a good approximation of the Binomial distribution. In this case, n=32w where w is usually 32 or 64, $$p=\frac{A-N}{T}$$

which is the rate of free pages. So p shall satisfy the following inequalities:

$$0.5\% < \frac{5}{32\times 32} \leq p \leq 1-\frac{5}{32\times 32} < 99.5\%, \text{ when } w=32$$
$$0.2\% < \frac{5}{32\times 64} \leq p \leq 1-\frac{5}{32\times 64} < 99.8\%, \text{ when } w=64. \quad (8)$$

The above inequalities suggest that for almost all values of probability p in these scenarios, Normal distribution can be used to estimate the various probabilities associated with the Binomial distribution. Hence, the Binomial distribution can be approximated by a Normal distribution with the same mean $\mu=np$ and standard deviation $\sigma=\sqrt{np(1-p)}$, that is $$\mu=32w\frac{A-N}{T},\ \sigma=\frac{\sqrt{32w(A-N)(T-A+N)}}{T}.$$

Therefore, $S_i$ is approximately a discrete-time Brownian motion process with drift μ and scale σ. The inverse Gaussian describes the distribution of the time a Brownian motion with positive drift takes to reach a fixed positive target. The density function of the inverse Gaussian distribution is $$f(t)=\frac{a}{\sigma\sqrt{2\pi t^3}}\exp\left[-\frac{(a-\mu t)^2}{2\sigma^2 t}\right].)$$

In this case, target value α=32. The distribution model shows that as $$t\to\infty,\ f(t)\sim t^{-\frac{3}{2}},$$

that is to say the probability for achieving the target value after some long time becomes increasingly small.

Finally the expectation of the first passage time B can be derived as:

$$TAS=WAS\leq E(B)=\int_{t=0}^{\infty} tf(t)dt=\int_{t=0}^{\infty}\frac{a}{\sigma\sqrt{2\pi t}}\exp\left[-\frac{(a-\mu t)^2}{2\sigma^2 t}\right]dt \quad (7)$$

Although a closed-form of Eq. (7) is not known, its value is not large with respect to the ratio between the target value 32 and the drift μ. The CoRW algorithm improves over RW-BM by removing the gap between TAS and WAS and therefore lowering WAS.

Figure 7:
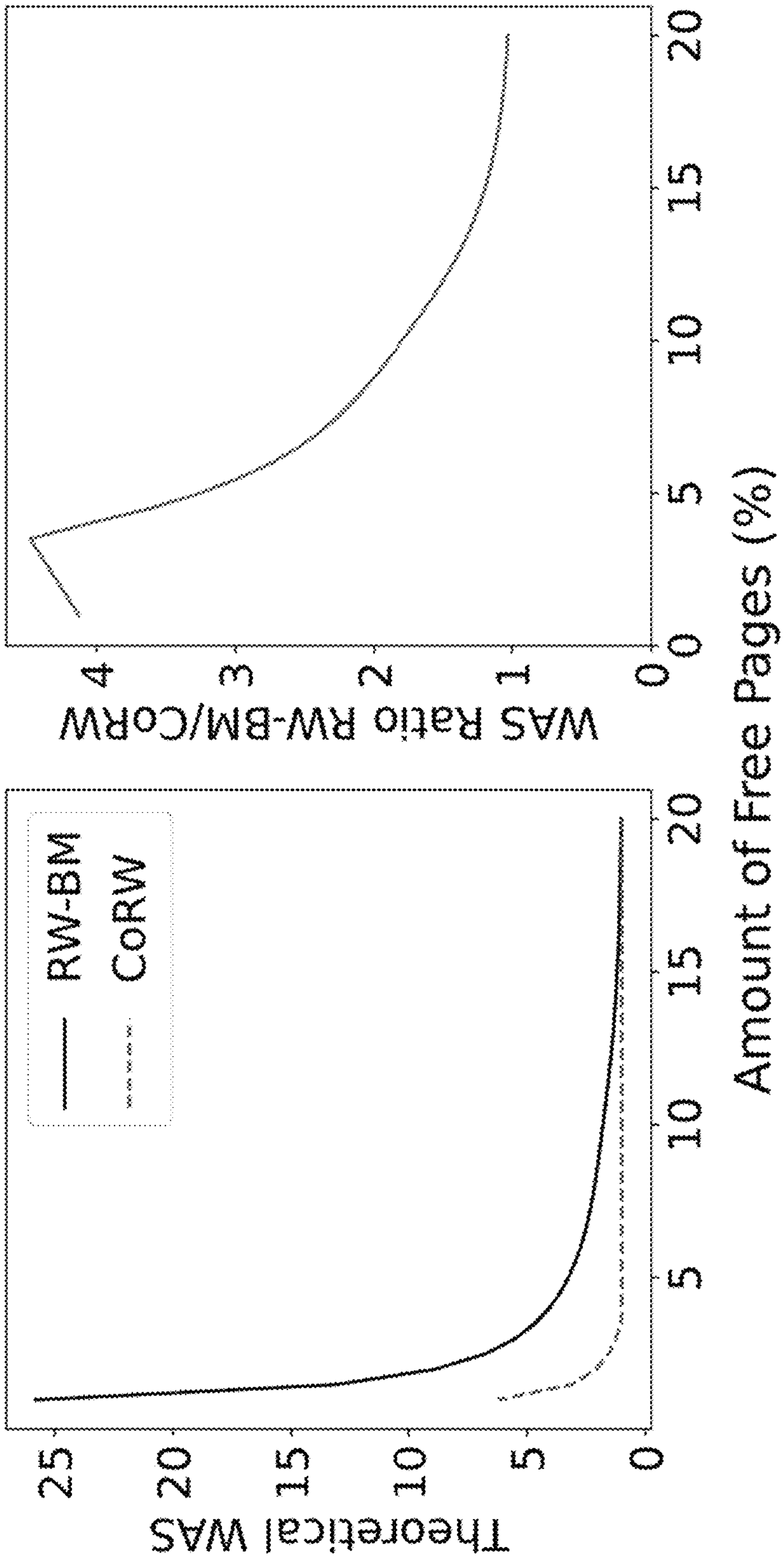
FIG. 7 shows two graphs illustrating theoretical results for WAS of RW-BM and CoRW, according to some embodiments.

FIG. 7 compares the WAS values of CoRW and RW-BM derived from equations (6) and (7), respectively. According to FIG. 5, CoRW improves WAS significantly, and the improvement is greater at lower free percentages by up to 4 times.

Figure 8:
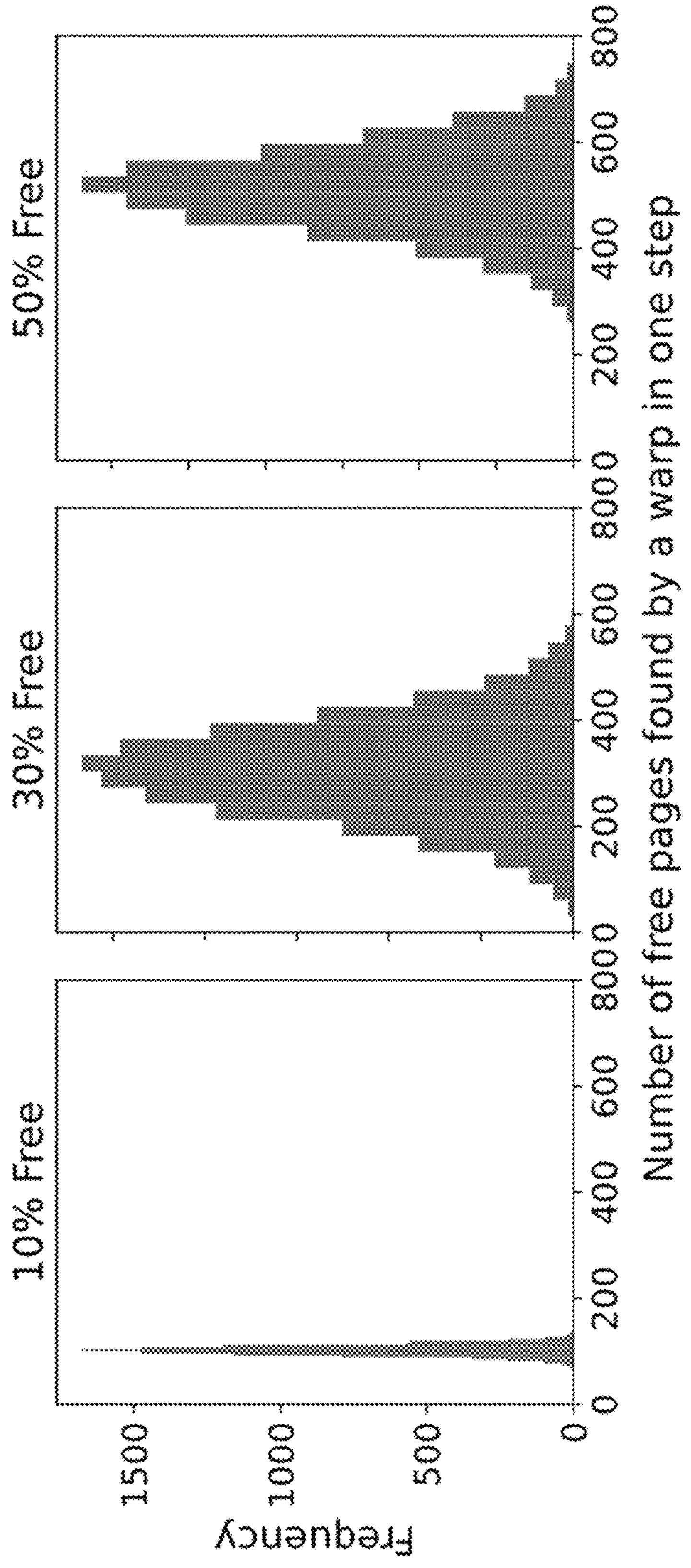
FIG. 8 show three graphs illustrating frequencies of the number of pages found by a warp in one step, according to some embodiments.

As a special note, the analysis above shows that in theory, the number of free pages found by a warp at any moment can be approximated with a Normal distribution. To further support this assumption in these scenarios, a kernel of 32 threads is executed (one warp) that requests pages and collects the number of pages found in one step. This kernel was run 10,000 times and present the data distribution of the number of pages found in FIG. 8, which clearly supports the assumption. Please note that only one warp was executed in these experiments to keep the distribution static when the warp is searching for pages. In a multi-warp environment, the distribution is dynamic but is upper-bounded by the static Normal distribution at the end of the kernel, as stated above.

In this analysis, it is also assumed that all 32 threads participate in the allocation request. This may not be the case when the allocation request is made within a conditional statement, as demonstrated in the second example of Listing 1. When this happens, the factor μ in Eq. (7) decreases, which causes the expectation to increase and thus reduces CoRW's effectiveness.

Clustered Random Walk: Another search algorithm is introduced, called Clustered Random Walk (CRW) based on the intuition that if one page is found free, its adjacent page(s) are likely to be free. In other words, a free page can be viewed as a member of a free-page cluster.

Figure 9:
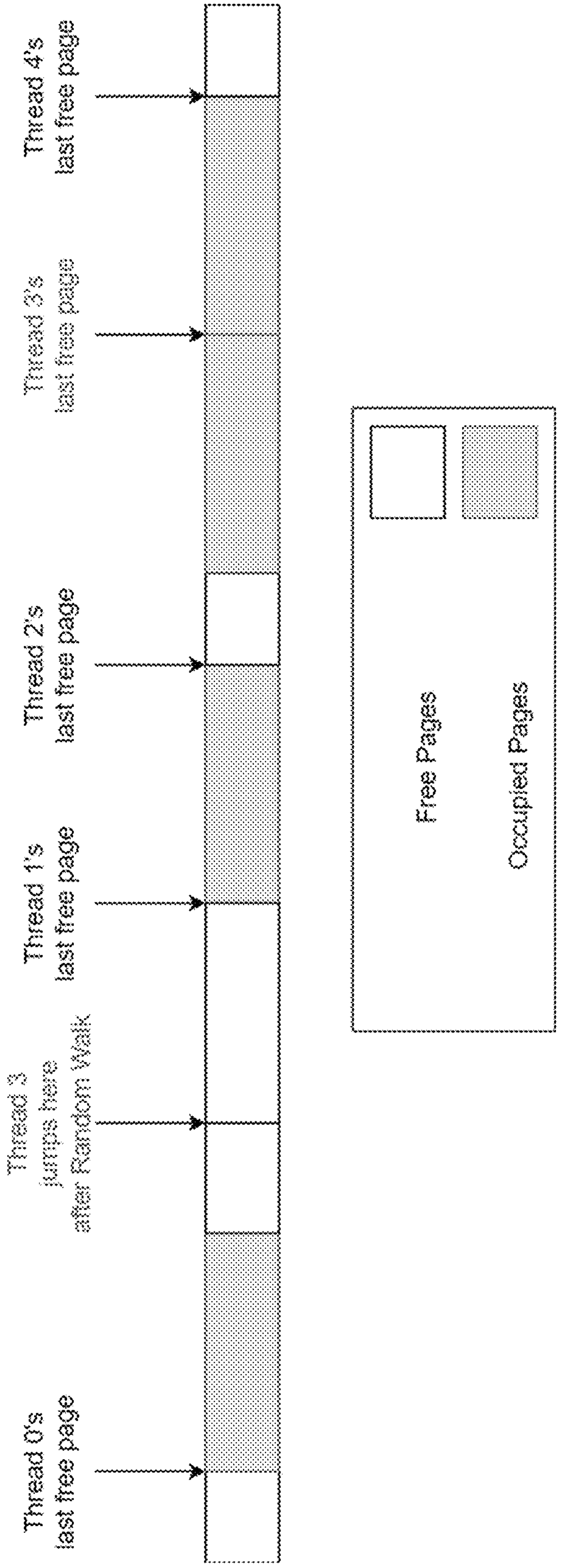
FIG. 9 is an illustration of the CRW idea, according to some embodiments.

A visual demonstration is presented in FIG. 9: all threads keep drawing from their own free-page cluster. Threads 0, 1, and 3 still have free pages in their clusters, so they can quickly grab one. Thread 2 runs out of free pages in its cluster and has to perform a random walk to find a new cluster.

Detailed implementation of CRW is presented below in Algorithm 4. A thread-level local variable last_free_page is introduced, which stores the ID of the last page obtained by that thread. With that, the CRW algorithm stores the last page that each thread has obtained and tries to return the adjacent page to serve the next getPage request. If the adjacent page is not available, CRW calls the regular RW procedure to get a page. Before returning a free page, the ID of the newly-acquired page needs to be saved to last_free_page.

CRW has two advantages over RW. First, with a certain (high) probability, one can quickly get a page from last_free_page, thus saving the time to continue the random walk, which is more expensive than accessing last_free_page. Second, fragmentation is reduced because used pages are clustered and free pages are also clustered.

Algorithm 4: GET PAGE Based on CRW

```
input: w: word's length, 32 or 64
output: ID of a free page acquired
1:    n = last_free_page + 1
2:    p = n/32
3:    r ← Atomically set LockMap[p] to 1
4:    P ← (r == 1)? 0xffffffff : BitMap[p]
```

-continued

```
5:    f ← ffs(~P)
6:    if f is valid then
7:        set f^th bit in BitMap[p] to 1
8:        page_ID = p*w+f−1
9:        last_free_page = page_ID
10:       return page_ID
11:   end if
12:   page_ID = getPageRandomWalk( )
13:   last_free_page = page_ID
14:   return page_ID
```

Performance of CRW: During the lifetime of a program that utilizes the CRW algorithm, acquired pages tend to occupy consecutive space in the buffer pool. Therefore, the buffer pool is divided at any point into clusters of consecutive occupied pages and consecutive free pages. This trend may be broken with external fragmentation, i.e., irregular page-freeing patterns that fragment a large cluster into many smaller clusters. Analysis of CRW performance will be based on studying the spatial distribution of such clusters.

TAS Analysis: Let $X_{i'}$ be the random variable representing the number of steps taken until finding a free page using the CRW algorithm, $X_i$ be that of the RW algorithm, and p is the probability that the adjacent page to the last free page is occupied. $X_{i'}$ can be represented with $X_i$ as:

$$X_{i'} = \begin{cases} 1 \text{ with probability } 1-p \\ 1+X_i \text{ with probability } p \end{cases}$$

The two cases in the equation above represent the two branches in Algorithm 4, lines 7-10 and lines 12-14. It can be seen that any statistical moment of $X_{i'}$ is upper bounded by that of $X_i$. For example, the first moment of $X_{i'}$ is: $E(X_{i'})=1-p+p(E(X_i)+1)=1+pE(X_i)$ according to the law of total expectation: $E(X_{i'})\le E(X_i)+1$. The equality is reached when p=1. Therefore, the key parameter for the analysis of $E(X_{i'})$ is p. Here, $E(X_i)$ follows Equation (5) if Bitmap is used and Equation (3) otherwise.

To formulate p, one needs to introduce the concept of free-page clusters. In a buffer pool of T pages, a cluster [a, b] is a set of consecutive free pages, page a−1 and page b+1 are occupied. Since the algorithm tries to get consecutive pages by saving the last free page that it obtained, a thread would keep drawing from one cluster until that cluster is depleted, after which it performs Random Walk to find a new cluster. Therefore, quantity p is the same as the probability that a cluster is depleted in the previous getPage request, that is, when a=b. One needs to mathematically characterize the system at two points in time, the previous getPage request and the current getPage request.

Let $M_{t-1}$ be the number of free-page clusters and $\alpha_{1,t-1}$, $\alpha_{2,t-1}$, . . . , $\alpha_{M_{t-1},t-1}$ be the (positive) sizes of the clusters before the getPage request at time t−1. The sum of $M_{t-1}$ cluster sizes must be $A_{t-1}$, which is the total number of free pages in the buffer pool at that moment: $\alpha_{1,t-1}+\alpha_{2,t-1}+\ldots+\alpha_{M_{t-1},t-1}=A_{t-1}$. Similarly, before the current request:

$$a_{1,t}+a_{2,t}+\ldots+a_{M_{t-1},t}=A_t. \quad (8)$$

Note that in this, $\alpha_{i,t}$ can be 0 and the time index is not updated for $M_{t-1}$. The probability $p=P(\alpha_{i,t}=0)$ can be calculated as follows.

$$p = \frac{\text{number of solutions to } Eq.(8) \text{ where } a_{i,t} = 0}{\text{number of solutions to } Eq.(8)}$$

Eq. (8) is a simple linear Diophantine and its number of solutions has been proven by using the stars-and-bars representation as follows. Suppose that there are $A_t$ stars and $M_{t-1}-1$ bars, an arrangement of the stars and bars is equivalent to one solution of Eq. (8) where the number of stars between two bars equals the value of one $\alpha_{i,t}$. For example, let $A_t=10$ be the number of stars and $M_{t-1}-1=3$ be the number of bars. One possible arrangement of 10 stars and 3 bars is:

*|||*****

This arrangement is equivalent to the solution $\alpha_{1,t}=1$, $\alpha_{2,t}=2$, $\alpha_{3,t}=0$, $\alpha_{4,t}=7$ for Eq. (8) where $A_t=10$ and $M_{t-1}=4$. Note that there is no star between the second and third bar, equivalent to $\alpha_{3,t}=0$.

Following this logic, the total number of solutions to Eq. (8) is the number of arrangements of $A_t$ stars and $M_{t-1}-1$ bars, which is the number of ways to select $M_{t-1}-1$ positions among $A_t+M_{t-1}-1$ positions to insert the bars (and thus leave the remaining $A_t$ position for the stars). The number of ways to select $M_{t-1}-1$ positions among $A_t+M_{t-1}-1$ positions is:

$${}^{A_t}M_{t-1} = \frac{(A_t + M_{t-1} - 1)!}{(M_{t-1} - 1)!\, A_t!}.$$

This is the total number of solutions to Eq. (12). Now the number of solutions to Eq. (8) is found, where one $\alpha=0$. Given one $\alpha=0$, Eq. (8) becomes $\alpha_{1,t}+\alpha_{2,t}+\ldots+\alpha_{M_{t-1}-1,t}=A_t$.

Similar to the above, the total number of solutions to this equation is $${}^{A_t}M_{t-1}-1 = \frac{(A_t + M_{t-1} - 2)!}{(M_{t-1} - 2)!\, A_t!}.$$

Therefore, $$p = P(a_{i,t} = 0) = \frac{(A_t + M_{t-1} - 2)!\,(M_{t-1} - 1)!\,A_t!}{(M_{t-1} - 2)!\,A_t!\,(A_t + M_{t-1} - 1)!} = \frac{M_{t-1} - 1}{A_t + M_{t-1} - 1}.$$

To simplify, the time index is dropped:

$$p = \frac{M - 1}{A + M - 1}, \tag{9}$$

where A is the current number free pages and M is the number of clusters before the previous getPage request.

Following that, TAS is:

$$E(X_{i'}) = 1 + \frac{M - 1}{A + M - 1} \times \frac{T}{N} \ln\left(\frac{A}{A - N}\right). \tag{10}$$

When there are few large clusters, $M\rightarrow 1$ and $E(X_{i'})\rightarrow 1$. When there are many small clusters, $M\rightarrow T$ and $E(X_{i'})$ approaches the $E(X_i)$ value of the RW algorithm. Therefore, when an irregular page-freeing pattern breaks the space into many small clusters, it can be observed that the performance of CRW converges to that of RW. This shows that CRW is of significant intellectual and practical value as it will consistently outperform RW.

Figure 10:
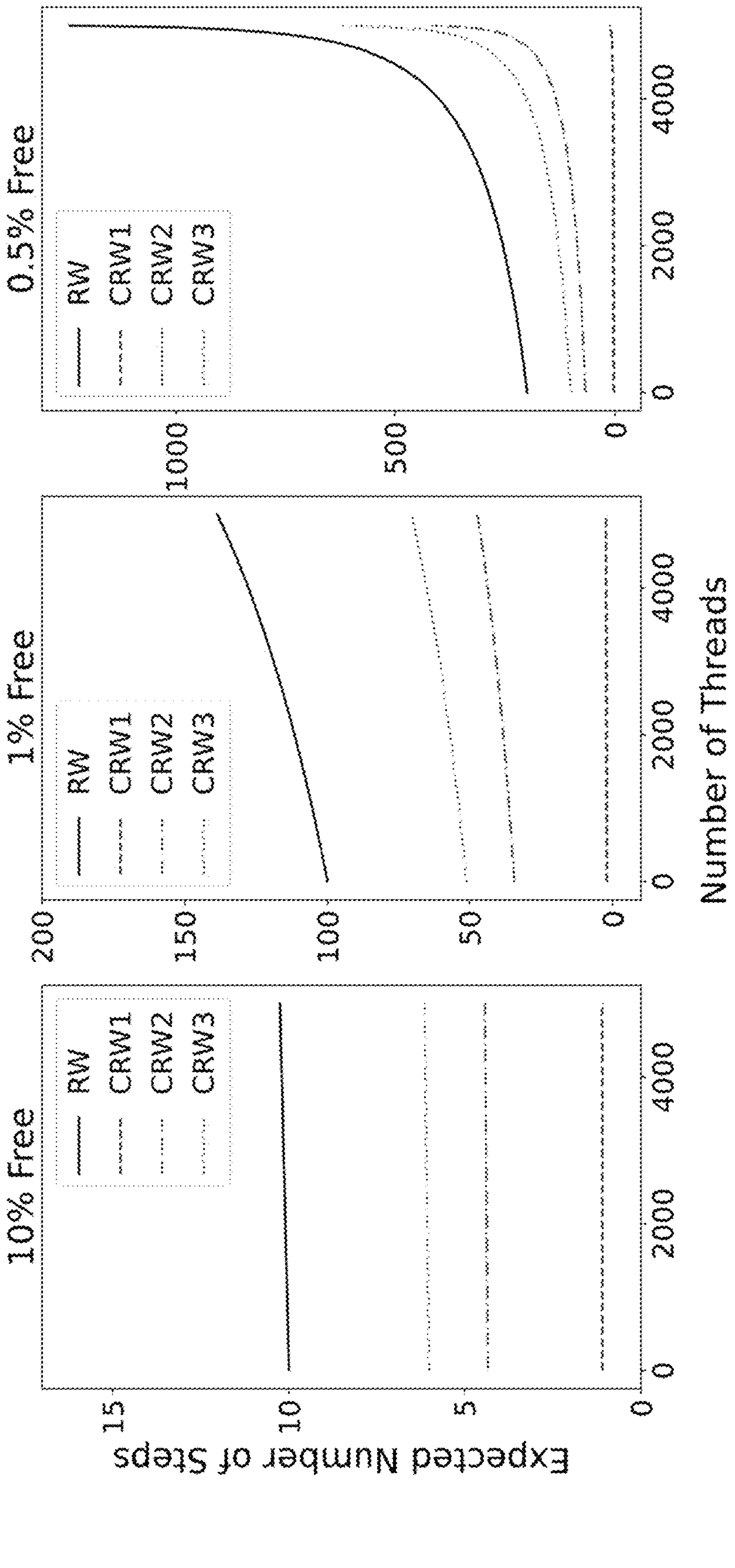
FIG. 10 shows three graphs illustrating the expected number of steps of CRW under various M values, according to some embodiments.

In FIG. 10, the theoretical TAS values of the RW (Eq. 3) and CRW (Eq. 10) algorithms are plotted under four scenarios with different percentages of free pages. For each scenario, the results under three different M values are shown. In all cases, the TAS value of CRW is much smaller than that of RW. Even when M=A (CRW3) and 0.5% free pages, RW is about twice as large as CRW.

WAS Analysis: The intra-warp max is $Y_{i'}=\max(X_{0'}, X_{1'}, \ldots, X_{31'})$. Since $X_{i'}=1$ if a thread can immediately find a free page next to the last known free page and $X_{i'}=X_i$ otherwise, $Y_{i'}$ is the maximum of a number Q of random variable $X_i$ where $Q\leq 32$: $Y_{i'}=\max(X_0, X_1, \ldots, X_Q)$.

The expectation of $Y_{i'}$, $E(Y_{i'})$, is upper-bounded by WAS of RW, $E(Y_i)$, because $Y_i$ is the maximum of 32 random variables $X_i$. Therefore, $E(Y_{i'})$ is also upper bounded by $E(Y_i)$'s upper bound, which is presented in Equation (6) if Bitmap is used and (4) otherwise. This means that, with respect to the intra-warp max steps, CRW is (upper) bounded by RW. A closed-form estimate of $E(Y_{i'})$ is very difficult to achieve analytically because Q itself is also a random variable.

Algorithm 5 RW_MALLOC

```
input: n, number of consecutive pages to find
output: the ID of the first free page
t ← land ID(0-31) of this thread
pageID ← −1
needMask ← ballot_sync(pageID == −1)
while needMask ≠ 0 do
   If t is any chosen thread then p ← random integer within [0,T/w)
   P ← BitMap[p+t]
   S, L ← first range of consecutive unset bits on P
   hasMask ← ballot_sync(L>0)
   while hasMask ≠ 0 and needMask ≠ 0 do
      for t': 0 → 31 do
         S1 ← shfl_sync(S, t')
         L1 ← shfl_sync(L, t')
         If pageID == −1 and L1 > n then take ← true
         if this thread has the lowest t whose take == true then
            Atomically set the S1 → S1 + L1−1 bits of BitMap[p+t']
            If success then pageID ← corresponding page ID
         end if
      end for
      needMask ← ballot_sync(pageID == −1)
      S, L ← next consecutive unset bits on P
      hasMask ← ballot_sync(L>0)
   end while
end while
return pageID
```

Figure 11:
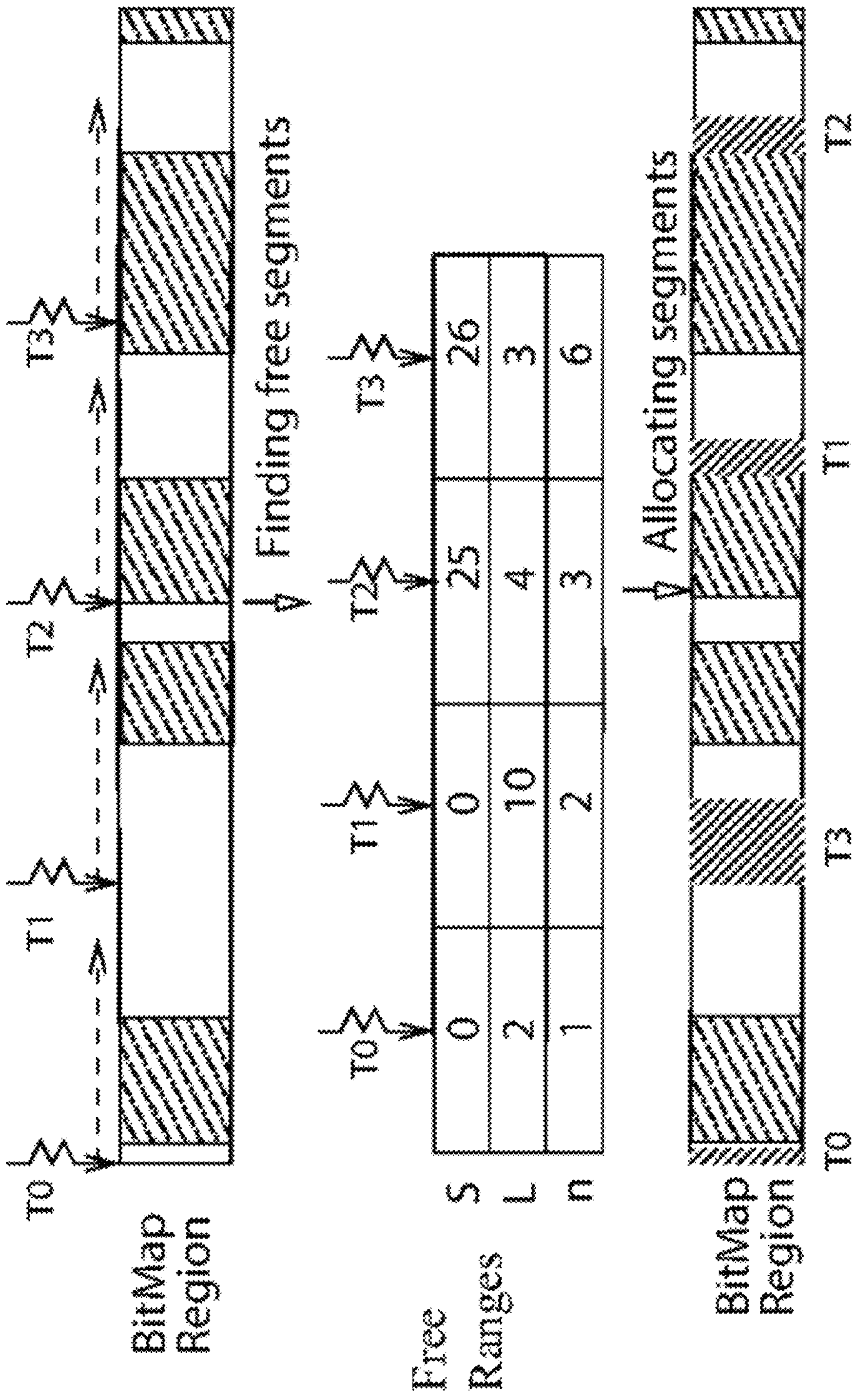
FIG. 11 is an illustration of 4 threads running the RW algorithm, according to some embodiments.

FIG. 11 illustrates an example of four threads running the RW_malloc algorithm described above.

Evaluation—Experimental Setup: Four experiments were performed to compare these methods with Ouroboros, ScatterAlloc, and the built-in CUDA allocator in a unit-test setup. All systems are configured to have a total of 10 GB in the memory pool and to serve the maximum request size of 8192B. Each chunk in the Ouroboros system is 8192B large, and there are ten processing queues that process requests of size 8192B, 4096B, 2048B, etc. The same Ouroboros and ScatterAlloc code and environment configurations are used to ensure a fair and meaningful comparison. The four algorithms are compared: basic Random Walk without bitmap (RW), Random Walk with Bitmap (RW-BM), Clustered Random Walk with Bitmap (CRW), and Collaborative Random Walk (CoRW). In RW-BM, CRW, and CoRW, 32-bit words are used for the bitmap. All of the code was built under CUDA 11.4 and all experiments are run with an NVidia Titan V GPU. Each data point presented in all figures is the average of 100 experimental runs with the same parameters.

CoRW and CRW have very similar performance, and their differences are not observable in a plot where Ouroboros and RW are present. Therefore, RW, CoRW, and Ouroboros are compared, as well as CoRW and CRW.

Metrics: In all experiments, the total kernel time is measured, TAS, and WAS. TAS is measured by taking the average of step counts recorded across all threads and WAS by taking the average of the maximum number of steps per warp. The Ouroboros implementation does not provide a measurement of step count, so a simple queue solution is implemented as a proxy for measuring TAS and WAS of queue-based solutions.

Experimental Results—Performance of GetPage: First, the performance of Ouroboros, RW, RW-BM, and CoRW is compared in getting a single page. Specifically, a single GPU kernel is developed, whose only task is to request a page of 256B from the memory buffer pool. Similarly, a kernel running on the Ouroboros system that requests a page of 256B is set up for each thread. The kernel is launched with various numbers of threads (i.e., changing the N value) and free percentage (i.e., changing the A value). Experiments with various page sizes from 4B to 1024B were also performed and it was found that performance remains the same regardless of page size.

Figure 12:
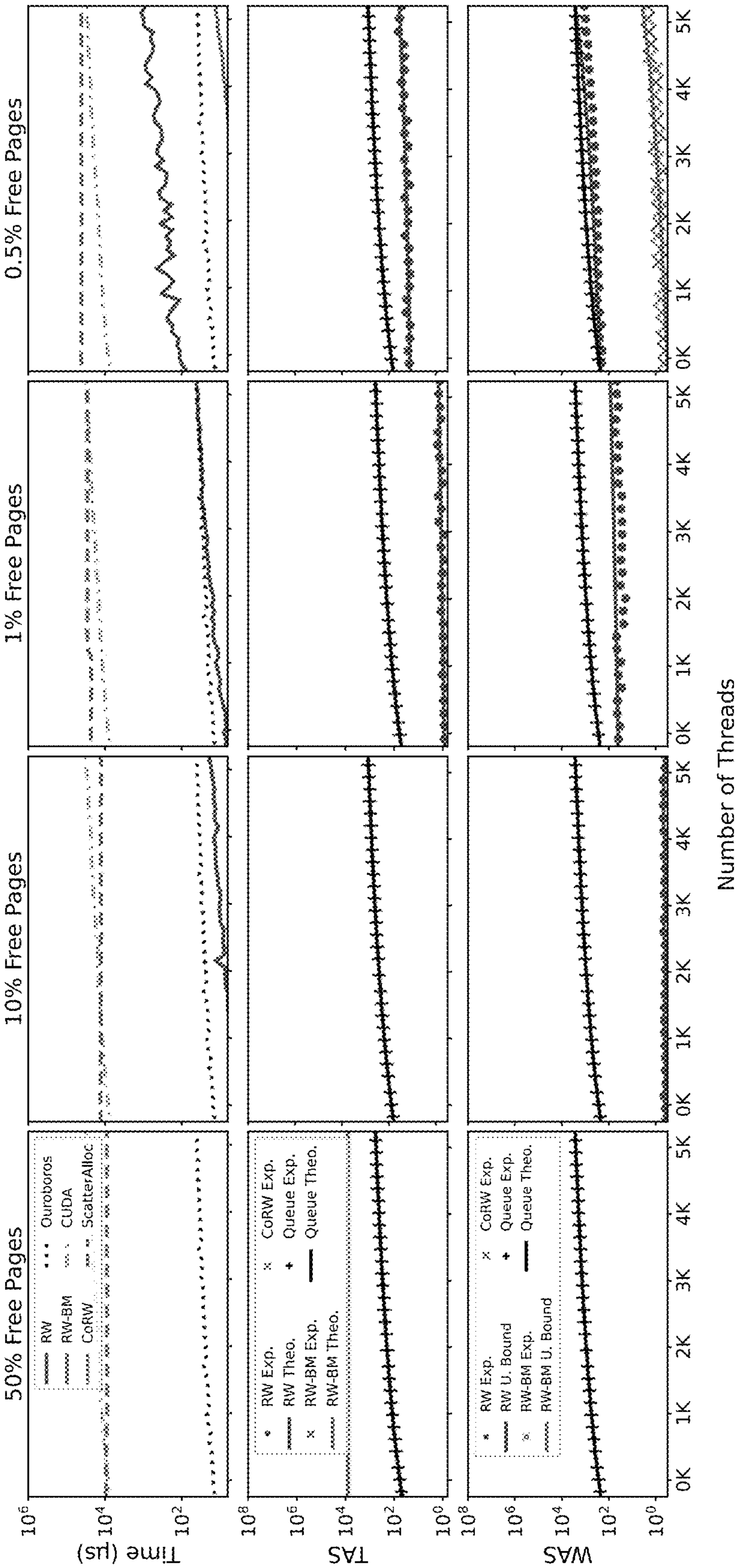
FIG. 12 shows several graphs that illustrate performance metrics of a unit-test kernel under different conditions, according to some embodiments.

FIG. 12 shows the three metrics measured from kernels that call Ouroboros (simple queue in case of TAS and WAS), RW, RW-BM, and CoRW. The simple queue was implemented as described above. The four columns represent scenarios with different free percentages. In each scenario, some pages are preset as occupied so that the percentage of free pages before starting the kernels is 50%, 10%, 1%, and 0.5%, respectively. Results from the first row show that the most advanced method CoRW outperforms Ouroboros by more than an order of magnitude when the free percentage is more than 1%. When the free percentage is 0.5%, CoRW outperforms Ouroboros by up to 3 times. Note that the 0.5% free percentage is a really extreme case that is not expected to happen frequently in applications—it means that after serving all the requests, there are 0 pages left. Another observation is: the Ouroboros running time increases with the number of threads, but this algorithm is insensitive to that (except for the 0.5% free page case).

Results from the second and the third rows confirm the validity of the theoretical results (i.e., Equations (3), (4), (5), and (6)). First, the measured TAS values match the theoretical results well. The theoretical upper bound of WAS matches experimental results well, even under 1% of free pages, indicating the bounds are tight. The bound becomes loose as the percentage of free pages decreases to below 1%. Visually, the growth patterns of lines in the 1st row of FIG. 12 matches better with that on the third row (WAS) than on the second row (TAS). This shows that WAS is a better indication of the total running time than TAS.

CoRW versus CRW: Second, the performance of CoRW and CRW were compared. Both are very efficient, and their interesting characteristics are observable in low-memory conditions. By design, CoRW becomes more efficient as more threads in a warp participate in the allocation request. Therefore, several kernels were implemented where a various number of threads in a warp request memory and other threads are inactive. The total kernel time is plotted in FIG. 13.

Figure 13:
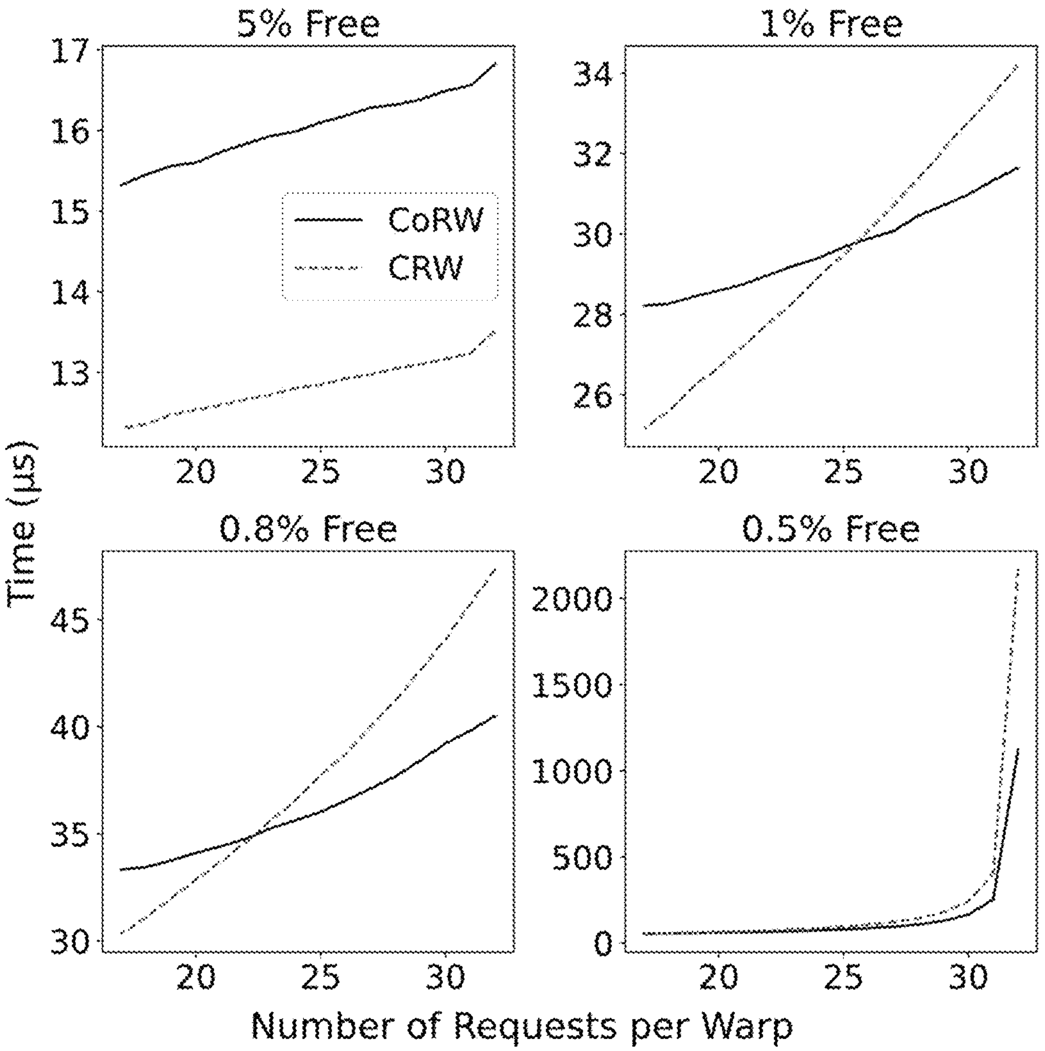
FIG. 13 shows four graphs that illustrate the performance of CoRW and CRW with different numbers of requests per warp, according to some embodiments.
Figure 14:
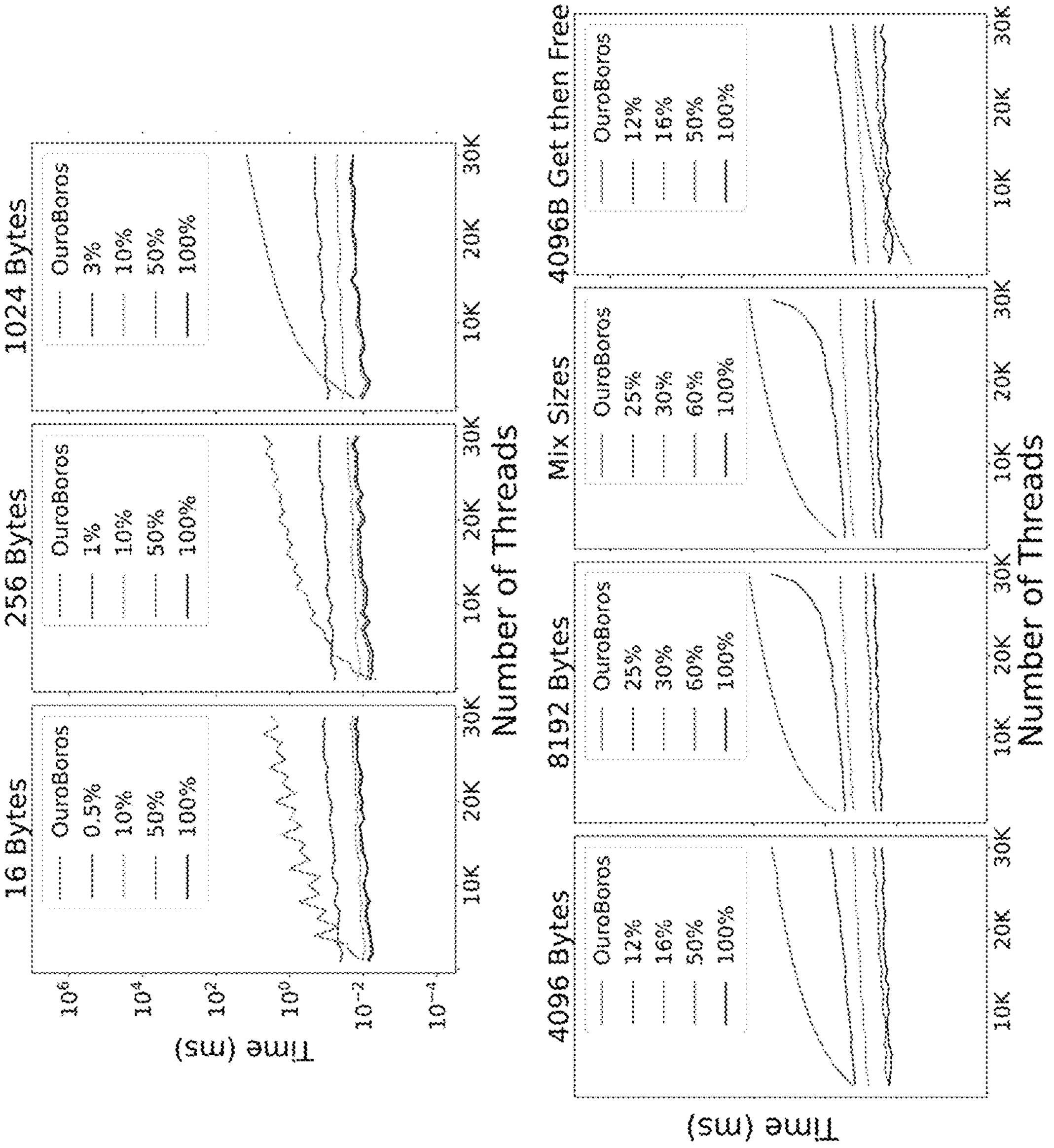
FIG. 14 shows several graphs that illustrate performance comparisons between processing systems, according to some embodiments.

FIG. 13 shows that CRW always outperforms CoRW when the system is at 5% free. At 1% free, CoRW is better when more threads participate in the request; the break-even happens at 25 threads. At 0.8% free, the break-even happens at 20 threads. Finally, at 0.5%, CoRW is always better. These results are consistent with this analyses because at a low free percentage, the difference between TAS and WAS of CRW becomes larger and WAS is more indicative of performance. On the other hand, CoRW performs well at a lower free percentage because its TAS and WAS are the same but is slightly less efficient at a high percentage due to overhead in communication between threads.

Memory Utilization: FIG. 13 shows that CRW always outperforms CoRW when the system is at 5% free. At 1% free, CoRW is better when more threads participate in the request; the break-even happens at 25 threads. At 0.8% free, the break-even happens at 20 threads. Finally, at 0.5%, CoRW is always better. These results are consistent with this analyses because at a low free percentage, the difference between TAS and WAS of CRW gets larger and WAS is more indicative of performance. On the other hand, CoRW performs well at a lower free percentage because its TAS and WAS are the same but is slightly less efficient at a high percentage due to overhead in communication between threads.

Performance of Free Page: The performance of Ouroboros, RW, RW-BM, and CoRW in freeing a single page is evaluated. A single GPU kernel is implemented, whose only task is to free a memory page of 256B that was obtained by a previous kernel. The kernel is launched with various numbers of threads (i.e., changing the N value) and free percentage (i.e., changing the A value).

Figure 15:
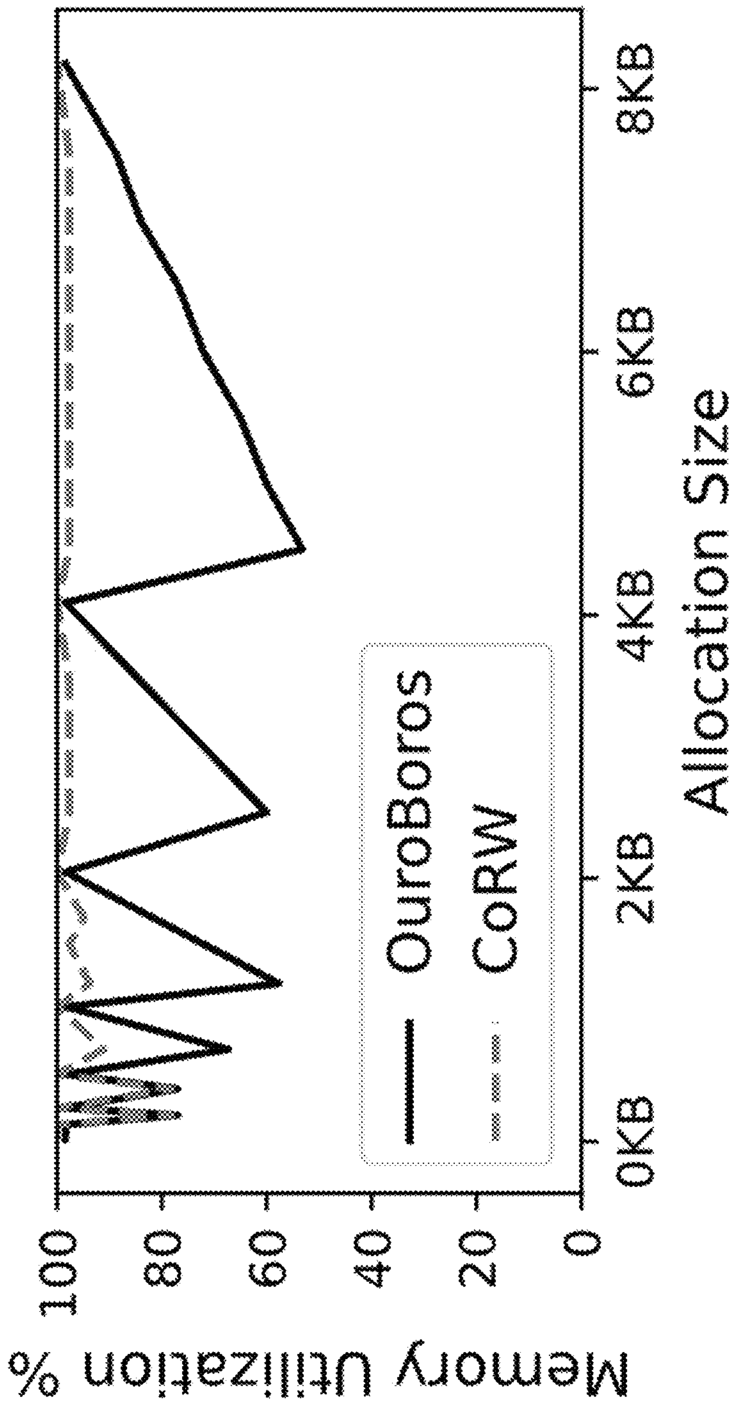
FIG. 15 is a graph illustrating an example comparison in memory efficiencies, according to some embodiments.
Figure 16:
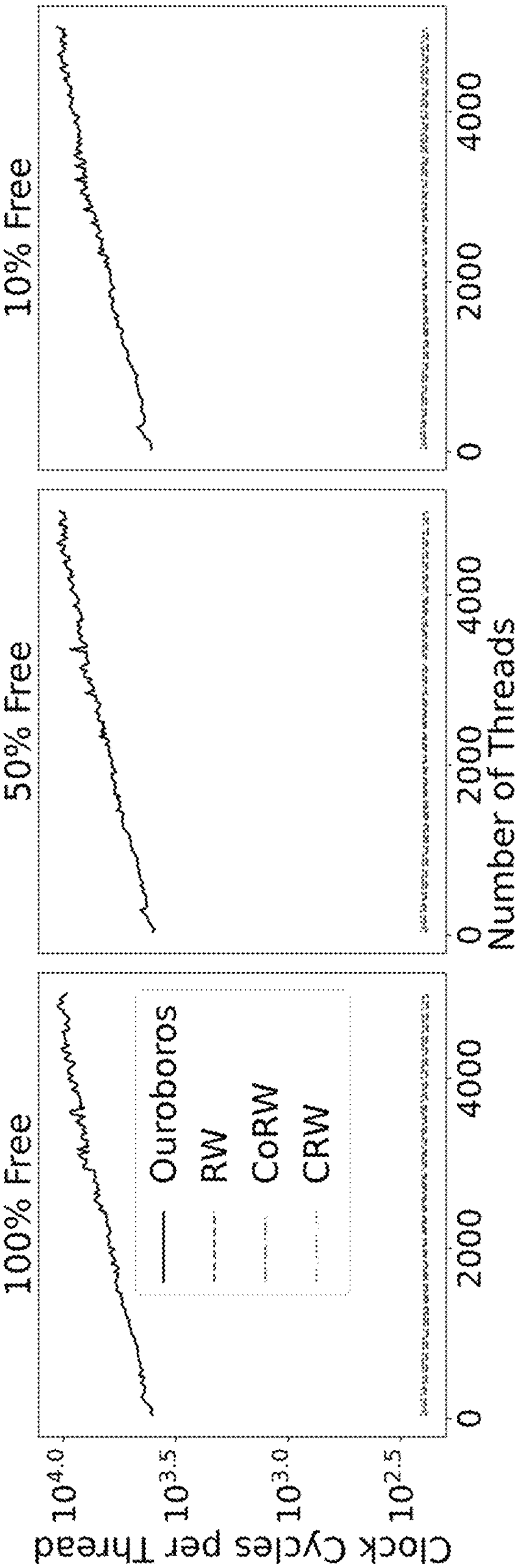
FIG. 16 shows three graphs that illustrate performance metrics at different numbers of parallel threads and percentages of free pages, according to some embodiments.

FIG. 15 shows the average latency in cycles each thread spends freeing the memory. Ouroboros' latency grows linearly with the number of concurrent threads. This is consistent to the pattern in FIG. 3. All of the methods described herein have more than ten times lower latency and their costs are consistent across all number of threads and free percentage.

Case Studies: The experimental results of actual GPU programs with page acquisition needs served by relevant algorithms are reported. Compared to the unit-tests discussed above, this gives an approach to evaluate the methods described herein in real-world applications. In particular, two operations implemented as part of a GPU-based database system are focused on, in which a global dynamic memory pool is maintained and shared by all GPU processes. The experimental environment is the same as described above.

Join Algorithm: Among the several types of join algorithms, a state-of-the-art hash join design is used as the foundation of this case study. Based on the popular idea of radix hashing, the algorithm includes three stages: partitioning input data, building a hash table, and probing. After building histograms for hash values and reordering both input tables in the first two stages, the probing will compare tuples of the corresponding partitions of the two tables and output one tuple whenever there is a match. The code was modified such that, when a thread finds a match, it will write the results to the current data page; when the page is full, the thread will ask for another page. The end-to-end processing time of all stages of the hash join code augmented was measured by various memory management implementations: Ouroboros, RW, and CoRW. As discussed in above, CoRW assumes many requests from threads in a warp at the same time and CRW is more applicable to sporadic requests in the warp. The hash join algorithm requests memory from many threads in a warp, therefore, more suitable for CoRW than for CRW. For this reason, CoRW was used rather than CRW in this experiment.

The code is run under different input table sizes from 16K to 64M tuples. Note that the data size roughly equals the total number of threads. It is also assumed that the memory management systems may be serving other database operations at the same time. Therefore, the percentage of free pages A/T is preset to 50% and 5% prior to the Hash Join operation call.

Figure 17:
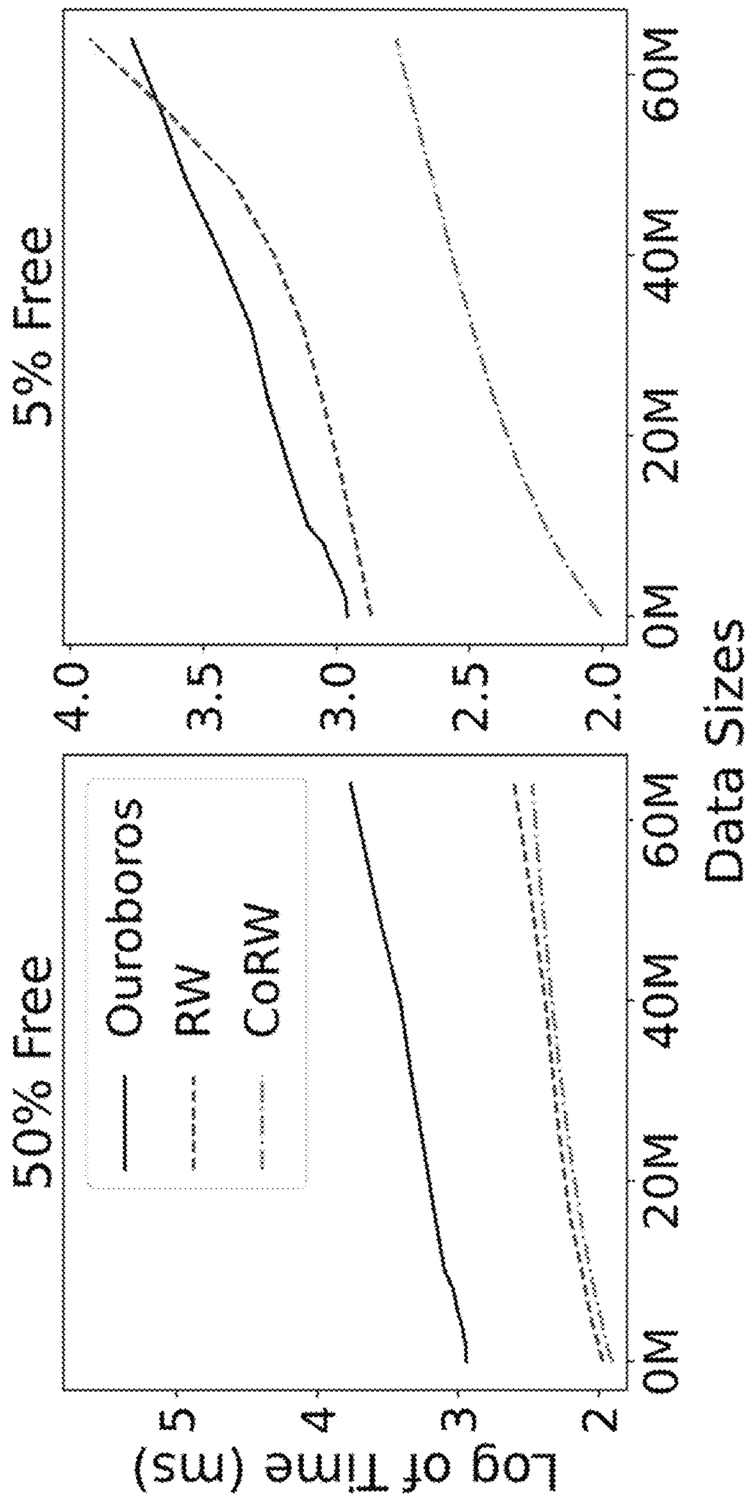
FIG. 17 shows two graphs that illustrate the processing times of a GPU-based hash join kernel under different data sizes and percentages of free pages, according to some embodiments.

FIG. 17 shows the wall time of the hash join program when using different memory management implementations. When using Ouroboros, the join program runs slower than the others by up to an order of magnitude. RW's performance degrades quickly as the data size increases under the low-memory situation. CoRW is significantly better than RW, especially in low-memory situations.

Group-By Algorithm: The Group-By operator in SQL aims at grouping tuples in a database table by distinct values of certain attributes (i.e., group key). This Group-By program follows a Radix-hash-based design. The design was improved to deal with a large number of distinct groups up to the size of the data domain. The program has multiple runs. In each run, all data tuples will be distributed into a hash table defined by k consecutive bits of the group key domain. Every tuple in a bucket will be further distributed into $2^k$ buckets in the next run. Parallelism is achieved by assigning each data tuple to a thread, which will find the bucket that the tuple belongs to and append the tuple to the end of the data list in that bucket.

In the existing Group-By program without using a memory manager, input data is stored in a pre-allocated chunk of memory. Although the total size of the data is known beforehand, the size of an individual data group is unknown. The GPU kernel twice is run twice, the first time for counting the size of each data group so that one can allocate memory for each group and the second time for writing the output. Therefore, each run requires $2^k$ buckets, and the last run requires $2^r$ buckets, where r is the range in binary. Therefore, a histogram containing all possible key values needs to be allocated, that is 17.19 GB of GPU memory for 32-bit keys.

With these dynamic memory management systems, one can allocate memory for each data group on the fly. There is no need to run the hash functions twice, and the kernels can be executed efficiently. Data tuples for a bucket are now stored in a chain of pages, and the last page maintains a tail pointer that points to the next available slot for appending new data. When the current page is full, a new page is obtained and the tail pointer is updated. The entire algorithm has a few runs, each covering a k-bit hash space. In each run, all the requested pages have an aggregated size of a little over the database table size; all of these pages will be freed in the next run.

Figure 18:
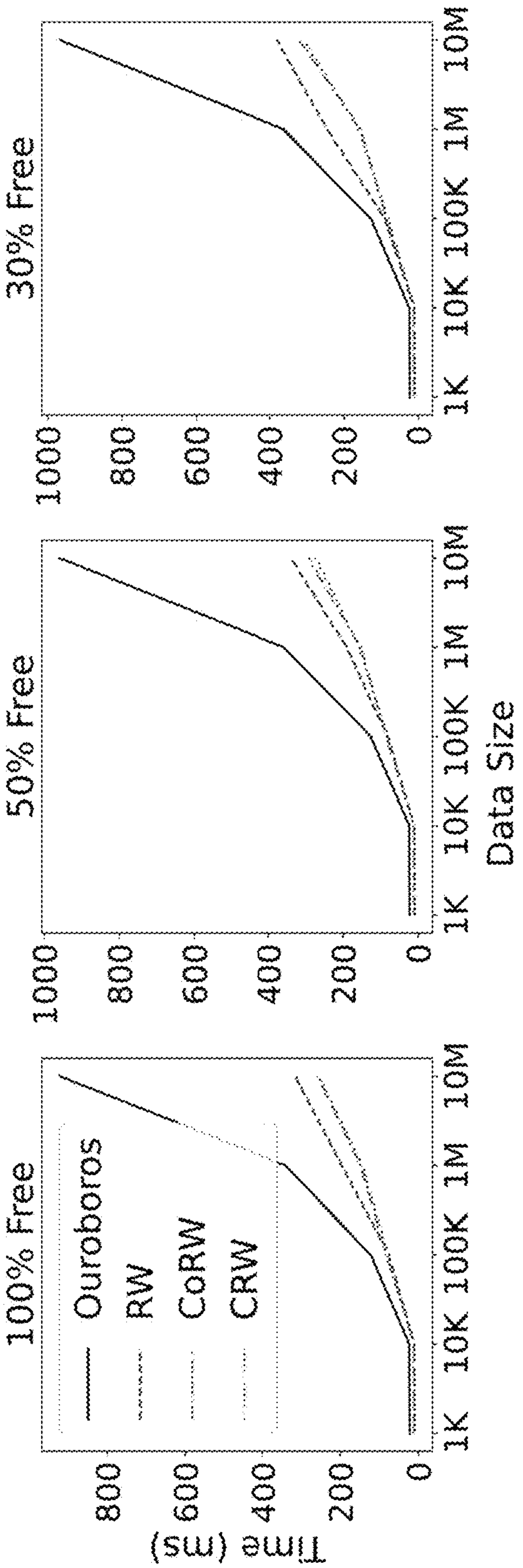
FIG. 18 shows three graphs that illustrate processing times of group-by kernels under different data sizes and percentages of free pages, according to some embodiments.

FIG. 18 shows exemplary performance of this Group-By code with the support of different memory management systems. The key is a 32-bit integer, and Radix hashing is conducted for 8 bits in each run (i.e., four runs altogether). The experiments are run under different input data sizes of up to 10 million keys, which are distributed by a Gaussian distribution. FIG. 18 shows that the processing time of these proposed systems grows very slowly as the amount of data grows. CoRW and CRW have very similar performances; they are better than RW by up to 30%.

Practical Applications

Software implementations. In some embodiments, a memory controller and/or bitmap technique (such as these aspects are described herein) may be implemented purely as a software solution. In this case, there would not necessarily be a need to modify hardware (e.g., a GPU or other manycore processor). Instead, the memory controller would be implemented as part of the operating platform or kernel of the hardware. For example, in some implementations, a 'getPage( )' function could be called when a memory allocation is needed for a given thread or application, and a 'freePage( )' function can be called to release a memory allocation for a given thread or application. This approach could, in GPU-based implementations, replace existing memory calls such as the malloc( ) and free( ) calls provided by NVIDIA's CUDA platform or similar platform of other manufacturers.

Thus, in some implementations a software platform is contemplated that provides for memory allocation and de-allocation functions. This software platform may be tailored to a given processor (e.g., a given class of GPUs or other manycore processors) and its device memory in that the randomness function(s) and manner of identifying memory page locations (and memory page allocation status identifiers) are applicable to the number and types of cores and the size and partitioning of the device memory. The software platform may also be of general applicability to any type of manycore processor that has a device memory. A user interface and/or library files may be provided in association with the software platform that allows a developer to write code for an application that will run on such a processor, using the memory allocation and deallocation functions of the present disclosure. For example, a developer may code a kernel function in C/C++ with software platform-specific syntax that indicates it should be executed on the manycore processor, wherein multiple instances/kernels may be running on the manycore processor at once with coordinated approaches to random memory allocation. In some embodiments, the software platform and/or user interface may intelligently determine whether the program (or any routines or functions of the program) could result in a threshold number of parallel threads (or blocks of threads), beneath which it may be more efficient to utilize a traditional, centrally-managed organization of memory allocation (so that each thread is directed to an available memory allocation in the first instance, rather than employing a random approach) and above which it would be more efficient to utilize an approach such as described herein (e.g., with respect to FIG. 2).

Hardware Adaptations: In some embodiments, it may be advantageous to adapt hardware architecture to match the parallelism of random allocation approaches (e.g., RW, CRW, CoRW). For example, a GPU may have a memory controller that is connected to multiple memories or memory channels, so that it can transmit multiple access requests to memory at once in parallel. Such a memory controller may be able to route memory requests according to "cluster" location through hardware architecture. Furthermore, a memory controller may be configured to serialize requests as appropriate for given memory channels and/or to combine or coalesce requests that randomly are adjacent.

Software and Hardware Implementations. In further embodiments, a memory controller may be implemented, or largely implemented at a hardware level via dedicated hardware components of a manycore IC (e.g., at a logic gate/transistor level) but also influenced and configured by software such as drivers and/or firmware. In these implementations, the hardware-level aspect of a memory controller may rely on instructions, parameters or other settings that are dictated at code level of a memory controller, but which result in different behavior of the hardware (e.g., adjusting memory access patterns, randomness approaches, clustering approaches, cooperation approaches, etc.).

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by any allowed claims that are entitled to priority to the subject matter disclosed herein. Features of the disclosed embodiments can be combined and rearranged in various ways.

What is claimed is:

1. A system comprising:

a memory;

one or more processors coupled with the memory and configured to execute a plurality of threads;

a memory controller configured to:

receive a request to allocate memory space for a first thread of the plurality of threads;

identify a last memory page allocated for the first thread prior to the request;

select a cluster corresponding to a subset of the plurality of memory pages based on the last memory page;

select a first memory page from a plurality of memory pages in the memory by randomly selecting an identifier of the first memory page from a plurality of identifiers of the plurality of memory pages, wherein randomly selecting the identifier mapped to the first memory page is from the selected cluster;

determine whether the first memory page is currently allocated;

based on a determination that the first memory page is not currently allocated, allocate the first memory page for the first thread; and based on a determination that the first memory page is currently allocated, select a different memory page from the plurality of memory pages for the request.

2. The system of claim 1, wherein the memory controller, to allocate the first memory page for the first thread, is configured to:

update a used bit associated with the first memory page to indicate that the first memory page is currently allocated.

3. The system of claim 2, wherein the memory controller, to allocate the first memory page to the first thread, is configured to:

execute an atomic operation to prevent allocation of the first memory page during parallel execution of other threads of the plurality of threads until the updating of the used bit is completed.

4. The system of claim 1, wherein the memory controller is further configured to:

deallocate the first memory page by updating a used bit associated with the first memory page to indicate that the first memory page is not currently allocated.

5. The system of claim 1, wherein the memory controller is further configured to:

store a plurality of used bits associated with the plurality of memory pages in a bitmap; and execute a single memory read operation to access multiple used bits associated with multiple memory pages from the bitmap.

6. The system of claim 1, wherein the one or more processors are configured to execute the plurality of threads in parallel.

7. The system of claim 1, wherein the memory controller is further configured to:

receive a request to allocate memory space for a set of threads in the plurality of threads, the set of threads including the first thread and a second thread; and collaboratively identify and allocate the first memory page for the first thread and a second memory page for the second thread.

8. A method comprising:

executing a plurality of threads in parallel using one or more processors;

detecting a request to allocate memory space of a memory associated with the one or more processors, from a first thread of the plurality of threads;

identifying a last memory page allocated for the first thread prior to the request;

selecting a cluster corresponding to a subset of the plurality of memory pages based on the last memory page;

selecting a first memory page from a plurality of memory pages in the memory by randomly selecting an identifier of the first memory page from a plurality of identifiers of the plurality of memory pages, wherein randomly selecting the identifier mapped to the first memory page is from the cluster;

determining whether the first memory page is currently allocated; and based on a determination that the first memory page is not currently allocated, allocating the first memory page for the request of the first thread.

9. The method of claim 8, further comprising:

based on a determination that the first memory page is currently allocated, selecting a different memory page from the plurality of memory pages for the request.

10. The method of claim 8, wherein allocating the first memory page for the first thread comprises updating a used bit associated with the first memory page to indicate that the first memory page is currently allocated.

11. The method of claim 10, further comprising:

executing an atomic operation to prevent allocation of the first memory page in other threads of the plurality of threads until the updating of the used bit is completed.

12. The method of claim 8, further comprising:

deallocating the first memory page by updating a used bit associated with the first memory page to indicate that the first memory page is not currently allocated.

13. The method of claim 8, further comprising:

storing a plurality of used bits associated with the plurality of memory pages in a bitmap; and executing a single memory read operation to access multiple used bits associated with multiple memory pages from the bitmap.

14. The method of claim 8, further comprising:

receiving a request to allocate memory space for a set of threads in the plurality of threads, the set of threads including the first thread and a second thread; and collaboratively identifying and allocating the first memory page for the first thread and a second memory page for the second thread.

15. A device comprising:

one or more processors coupled with a memory and configured to execute a plurality of threads; and a memory controller configured to:

receive a request to allocate memory space for a first thread of the plurality of threads;

identify a last memory page allocated for the first thread prior to the request;

select a cluster corresponding to a subset of the plurality of memory pages based on the last memory page; select a first memory page from a plurality of memory pages in the memory by randomly selecting an identifier of the first memory page from a plurality of identifiers of the plurality of memory pages, wherein randomly selecting the identifier mapped to the first memory page is from the selected cluster;

determine whether the first memory page is currently allocated;

based on a determination that the first memory page is not currently allocated, allocate the first memory page for the first thread; and based on a determination that the first memory page is currently allocated, select a different memory page from the plurality of memory pages for the request.

* * * * *